United States Patent
Pedurand

(10) Patent No.: US 11,878,543 B2
(45) Date of Patent: Jan. 23, 2024

(54) DEVICE FOR THE ROBOTIC PRINTING OF INDIVIDUALLY-PRINTED BOOKS, AND ASSOCIATED METHOD

(71) Applicant: R&D AUTOMATION, Monswiller (FR)

(72) Inventor: Hubert Pedurand, Coulanges la Vineuse (FR)

(73) Assignee: R&D AUTOMATION, Monswiller (FR)

(*) Notice: Subject to any disclaimer, the term of this patent is extended or adjusted under 35 U.S.C. 154(b) by 0 days.

(21) Appl. No.: 17/310,974

(22) PCT Filed: Feb. 7, 2020

(86) PCT No.: PCT/EP2020/053184
§ 371 (c)(1),
(2) Date: Sep. 2, 2021

(87) PCT Pub. No.: WO2020/177978
PCT Pub. Date: Sep. 10, 2020

(65) Prior Publication Data
US 2022/0134791 A1      May 5, 2022

(30) Foreign Application Priority Data
Mar. 6, 2019   (FR) ...................................... 1902286

(51) Int. Cl.
*B42C 19/08*   (2006.01)
*B26D 7/06*    (2006.01)
(Continued)

(52) U.S. Cl.
CPC ................ *B42C 19/08* (2013.01); *B26D 7/06* (2013.01); *B42C 5/04* (2013.01); *B42C 7/005* (2013.01);
(Continued)

(58) Field of Classification Search
CPC ........... B42C 19/08; B42C 5/04; B42C 7/005; B42C 9/0056; B42C 11/04; B42C 9/00;
(Continued)

(56) References Cited

U.S. PATENT DOCUMENTS 6,460,843 B1 * 10/2002 Dim ........................ B42C 19/02
                                                    412/4

FOREIGN PATENT DOCUMENTS

EP       1196296 A    4/2002
WO       9938707 A1   8/1999
(Continued)

OTHER PUBLICATIONS

French Search Report received for Application No. 1902286, dated Nov. 21, 2019.
(Continued)

*Primary Examiner* — Justin V Lewis
(74) *Attorney, Agent, or Firm* — Greer, Burns & Crain, Ltd

(57) ABSTRACT

A device for manufacturing a book on demand, including a cover printing or receiving station designed to respectively print or receive a cover, a body printing or receiving station designed to respectively print or receive a body, a binding station designed to join together the body and the cover, a conveyor designed and/or programmed to convey the cover and/or the body between the different stations, the device is designed to deposit glue in a gluing region on the verso of the cover inside the binding station before the cover and the body are joined together by gluing, forming a book.

25 Claims, 14 Drawing Sheets

(51) Int. Cl.
- *B42C 5/04* (2006.01)
- *B42C 7/00* (2006.01)
- *B42C 9/00* (2006.01)
- *B42C 11/04* (2006.01)
- *B25J 11/00* (2006.01)
- *B26D 7/00* (2006.01)

(52) U.S. Cl.
CPC ............ *B42C 9/0056* (2013.01); *B42C 11/04* (2013.01); *B25J 11/00* (2013.01); *B26D 2007/0081* (2013.01)

(58) Field of Classification Search
CPC .... B42C 7/00; B26D 7/06; B26D 2007/0081; B26D 7/00; B25J 11/00
USPC ...... 402/1, 4, 6, 8, 9, 11, 14, 16, 18, 19, 20, 402/22, 33, 37, 900, 902; 412/1, 4, 6, 8, 412/9, 11, 14, 16, 18, 19, 20, 22, 33, 37, 412/900, 902

See application file for complete search history.

(56) References Cited

FOREIGN PATENT DOCUMENTS

WO 0156794 A1 8/2001
WO 2016051528 A1 4/2016

OTHER PUBLICATIONS

International Search Report and Written Opinion received for PCT/EP2020/053184, dated May 19, 2020.
International Preliminary Report on Patentability received for PCT/EP2020/053184, dated Aug. 25, 2021.

* cited by examiner

DEVICE FOR THE ROBOTIC PRINTING OF INDIVIDUALLY-PRINTED BOOKS, AND ASSOCIATED METHOD

BACKGROUND

The present invention relates to a device for printing books. It also relates to a method for printing books.

The invention typically makes it possible for a user to print a book on demand, preferably in a single copy.

Devices for manufacturing a book on demand are known, such as for example as described in document EP 1 196 296.

However, such devices can present certain difficulties.

Firstly, after having printed a book block and a cover, the book block and/or the cover can sometimes become jammed in the device. The transport mechanism can present at least one of the following difficulties:
- complex production
- complex maintenance, in particular of the adhesive tank
- significant risk of jamming of the book block or of the cover or of both
- slow execution of the process as a whole.

Moreover, another difficulty is that the adhesion of the book block to the cover is not always perfect and these two elements may sometimes not hold together very well.

Document WO 01/56 794 A1 describes an apparatus for finishing paperback books.

Document WO99/38 707 describes an apparatus for binding a book.

The purpose of the present invention is to resolve at least one of these abovementioned difficulties.

SUMMARY

This objective is achieved with a device for manufacturing a book on demand, comprising:
- a cover printing or receiving station arranged to respectively print or receive a cover,
- a book block printing or receiving station arranged to respectively print or receive a book block,
- a binding station arranged to assemble the book block and the cover,
- transport means arranged and/or programmed to transport the cover and/or the book block between the different stations.

The device according to the invention is preferably arranged to deposit adhesive on an adhesive bonding area of the cover (preferably on the reverse of the cover), preferably inside the binding station, before assembly or casing-in by adhesive bonding of the cover on the book block, forming a book.

The device according to the invention preferably comprises heating means arranged to heat and/or maintain at a heated temperature adhesive deposited on the adhesive bonding area of the cover (preferably on the reverse of the cover) before assembly or casing-in by adhesive bonding of the cover to the book block.

The heating means preferably comprise:
- means for generating heat,
- a mouth arranged to limit the extent of the diffusion of this heat,
- preferably, a controller arranged and/or programmed to control an opening of the mouth as a function of a quantity and/or a width of adhesive deposited on the adhesive bonding area and/or as a function of a thickness of the book block.

The transport means are preferably arranged and/or programmed to position the cover in several positions comprising:
- a deposition position in which the adhesive bonding area is not located under the heating means and in which the device is arranged to deposit the adhesive on the adhesive bonding area, and/or
- a heating position in which the adhesive bonding area is located under the heating means, and/or
- a pre-assembly position in which the adhesive bonding area is not located under the heating means.

The heating position is preferably offset with respect to the deposition position in an offset direction and/or the pre-assembly position is preferably offset with respect to the heating position in this offset direction.

The binding station preferably comprises clamping means arranged to immobilize the cover in the deposition position and/or in the heating position.

The cover is preferably located in one and the same plane, called adhesive bonding plane, for these deposition, heating and/or pre-assembly positions.

The binding station is preferably arranged and/or programmed to position the cover in an assembly position offset with respect to the pre-assembly position at least partly perpendicularly to the offset direction so as to assemble or case-in the cover and the book block by adhesion.

The binding station preferably comprises a book block container arranged to receive the book block in a receiving position. The transport means are preferably arranged and/or programmed so that in the deposition position the adhesive bonding area is not located under the book block container of the binding station and/or so that in the pre-assembly position the adhesive bonding area is located under the book block container of the binding station.

In its receiving position, the book block preferably extends perpendicularly or substantially perpendicularly to the cover in its pre-assembly position and/or in its assembly position.

The transport means are preferably arranged and/or programmed to remove the book from the binding station perpendicularly or substantially perpendicularly to the offset direction and/or touching only the book block.

The device according to the invention preferably comprises a creasing station arranged to crease or carry out a pre-folding of the cover along several parallel fold lines (preferably on the back of the cover) extending over the entire width or length of the cover, preferably along two or four parallel fold lines, the transport means being arranged and/or programmed to insert the cover in the creasing station in a creasing position.

The deposition position is preferably offset with respect to the creasing position in an offset direction.

The creasing position preferably intersects the deposition position.

In its creasing position, the cover preferably extends perpendicularly or substantially perpendicularly to the cover in its deposition position.

The transport means preferably comprise a robotic arm equipped with digits arranged and/or programmed to manipulate the cover and/or the book block.

The device according to the invention preferably comprises an adhesive applicator gun, the robotic arm being arranged and/or programmed to grip the adhesive applicator gun to deposit adhesive on the adhesive bonding area of the cover (typically on the reverse of the cover) while the cover is placed (preferably flat) in the binding station. The adhesive applicator gun preferably comprises:

an adhesive reserve comprising a thread of solid adhesive wound in the form of a coil, means for unwinding the thread from the coil by an end of this thread and for melting this end of the adhesive thread so as to deliver the adhesive in a liquid or paste form.

The device according to the invention preferably comprises means for measuring or determining a thickness of the book block.

The device according to the invention is preferably arranged and/or programmed to determine then deposit a quantity of adhesive on the adhesive bonding area of the cover inside the binding station, this quantity of adhesive being a function of the measured or determined thickness of the back of the book block.

The cover printing or receiving station and the book block printing or receiving station preferably comprise a printer that is common to these two stations.

The device according to the invention preferably comprises a notch binding station. The transport means are preferably arranged and/or programmed to transport the book block from the book block printing or receiving station and up to the notch binding station and/or from the notch binding station up to the binding station. The notch binding station preferably comprises a book block container and means for notch binding an edge of the book block when it is arranged in the book block container of the notch binding station.

The transport means are preferably arranged and/or programmed to:
transport the assembled book from the binding station and up to the book block container of the notch binding station touching only the book block,
then drop the book in the book block container of the notch binding station,
then change grip by gripping the book by at least a part of the cover adhesively bonded to the book block.

The device according to the invention preferably comprises a trimming station arranged to trim the book, preferably on three sides of the book (head, side, and foot of the book).

The transport means are preferably arranged and/or programmed to transport the book from the notch binding station and up to the trimming station.

The trimming station is preferably linked to a catch tray for falling paper, the transport means being arranged and/or programmed to transport the book block in an initial format, preferably A4, up to the trimming station, then hold the book block in the trimming station for cutting into one part of the book block held in the transport means and another part of the book block cut and directed towards the catch tray, then assemble the two parts of the book block so as to form in the transport means a book block having a reduced format, preferably A5, but having an increased thickness in comparison with its initial format.

The device according to the invention preferably comprises a casing enclosing all of the stations, said casing comprising a lower part that is opaque, and an upper part equipped with a transparent window, the lower part and the upper part being separated by a separator plate that is opaque, said device also being characterized in that:
the robotic arm is located at least partly in the upper part, and/or
the binding station is located at least partly in the upper part, and/or
the creasing station is located at least partly in the upper part, and/or the notch binding station is located at least partly in the lower part and is accessible from the upper part through a slot made in the separator plate, and/or
the trimming station is located at least partly in the lower part and is accessible from the upper part through a slot made in the separator plate, and/or
the book block printing or receiving station is located at least partly in the upper part, and/or
the cover printing or receiving station is located at least partly in the upper part.

According to yet another aspect of the invention a method for manufacturing a book on demand is proposed, comprising:
printing or receiving, respectively at a cover printing or receiving station, a cover,
printing or receiving, respectively at a book block printing or receiving station, a book block,
assembling or casing-in, at a binding station, the book block and the cover,
transporting, by transport means, the cover and/or the book block between the different stations.

The method according to the invention preferably comprises depositing adhesive on an adhesive bonding area of the cover (preferably on the reverse of the cover) inside the binding station before assembly or casing-in of the cover and the book block by adhesion, forming a book.

The method according to the invention preferably comprises heating or maintaining at a heated temperature, by heating means, the adhesive deposited on the adhesive bonding area of the cover before assembly or casing-in of the cover and the book block by adhesion.

The heating or maintaining at a heated temperature can comprise:
generating heat,
limiting the extent of the diffusion of this heat by means of a mouth,
preferably controlling, by means of a controller, an opening of the mouth as a function of a quantity and/or a width of adhesive deposited on the adhesive bonding area and/or as a function of a thickness of the book block.

The transport means preferably position the cover in several positions comprising, in this order:
a deposition position in which the adhesive bonding area is not located under the heating means and in which the method comprises depositing the adhesive on the adhesive bonding area, and/or
a heating position in which the adhesive bonding area is located under the heating means, and/or
a pre-assembly position in which the adhesive bonding area is not located under the heating means.

The heating position is preferably offset with respect to the deposition position in an offset direction and/or the pre-assembly position is preferably offset with respect to the heating position in this offset direction.

The method according to the invention can comprise immobilizing, by clamping means, the cover in the deposition position during the depositing of adhesive and/or in the heating position during heating or maintaining at a heated temperature, by heating means, of the adhesive deposited on the adhesive bonding area of the cover.

The cover is preferably located in one and the same plane, called adhesive bonding plane, for these deposition, heating and/or pre-assembly positions.

The binding station preferably positions the cover in an assembly position offset with respect to the pre-assembly position at least partly perpendicularly to the offset direction so as to assemble the cover and the book block by adhesion.

The method according to the invention preferably comprises receiving, in a book block container of the binding station, the book block in a receiving position. The adhesive bonding area is preferably not located under the book block container of the binding station when the cover is in its deposition position, and/or the adhesive bonding area is preferably located under the book block container of the binding station when the cover is in its pre-assembly position.

In its receiving position, the book block preferably extends perpendicularly or substantially perpendicularly to the cover in its pre-assembly position and/or in its assembly position.

The transport means preferably remove the book from the binding station perpendicularly or substantially perpendicularly to the offset direction and/or touching only the book block.

The method according to the invention preferably comprises creasing or pre-folding, by means of a creasing station, the cover along several parallel fold lines (preferably on the back of the cover) extending over the entire width or length of the cover, preferably along two or four parallel fold lines, the transport means inserting the cover in the creasing station in a creasing position.

The deposition position is preferably offset with respect to the creasing position in the offset direction.

The creasing position preferably intersects the deposition position.

In its creasing position, the cover preferably extends perpendicularly or substantially perpendicularly to the cover in its deposition position.

The transport means preferably comprise a robotic arm equipped with digits manipulating the cover and/or the book block in order to transport it between the different stations.

The method according to the invention preferably comprises gripping, by means of the robotic arm, an adhesive applicator gun so as to deposit the adhesive from this applicator gun on the adhesive bonding area of the cover (preferably on the reverse of the cover) while the cover is placed (preferably flat) in the binding station. The adhesive applicator gun preferably comprises an adhesive reserve comprising a thread of solid adhesive wound in the form of a coil, the method comprising unwinding the thread from the coil by an end of this thread and a step in which this end of the adhesive thread is melted so as to deliver the adhesive in a liquid or paste form.

The method according to the invention preferably comprises measuring or determining a thickness of the back of the book block.

The method according to the invention preferably comprises determining then depositing a quantity of adhesive on the adhesive bonding area of the cover (preferably on the reverse of the cover) inside the binding station, this quantity of adhesive being a function of the measured or determined thickness of the back of the book block.

The cover printing or receiving station and the book block printing or receiving station preferably comprise a printer that is common to these two stations.

The transport means preferably transport the book block from the book block printing or receiving station and up to a notch binding station and/or from the notch binding station up to the binding station. The notch binding station preferably comprises a book block container and means that notch bind an edge of the book block when it is arranged in the book block container of the notch binding station before assembly of the cover and the book block by adhesion, forming the book.

The transport means preferably:
transport the assembled book from the binding station and up to the book block container of the notch binding station touching only the book block,
then drop the book in the book block container of the notch binding station,
then change grip by gripping the book by at least a part of the cover adhesively bonded to the book block while the book is still in the book block container of the notch binding station.

The method according to the invention preferably comprises trimming, by means of a trimming station, the book.

The transport means preferably transport the book from the notch binding station and up to the trimming station.

The trimming station is preferably linked to a catch tray, the transport means transport the book block in an initial format, preferably A4, up to the trimming station, then hold the book block in the trimming station for cutting into one part of the book block held in the transport means and another part of the book block cut and directed towards the catch tray, then assemble the two parts of the book block so as to form, in the transport means, a book block having a reduced format, preferably A5, but having an increased thickness in comparison with its initial format.

A casing preferably encloses all of the stations, said casing comprising a lower part that is opaque and an upper part equipped with a transparent window, the lower part and the upper part being separated by a separator plate that is opaque, said method also being characterized in that:
the robotic arm is located at least partly in the upper part, and/or
the binding station is located at least partly in the upper part, and/or
the creasing station is located at least partly in the upper part, and/or
the notch binding station is located at least partly in the lower part and is accessed by the robotic arm from the upper part through a slot made in the separator plate, and/or
the trimming station is located at least partly in the lower part and is accessed by the robotic arm from the upper part through a slot made in the separator plate, and/or
the book block printing or receiving station is located at least partly in the upper part, and/or
the cover printing or receiving station is located at least partly in the upper part.

BRIEF DESCRIPTION OF THE DRAWINGS

Other advantages and features of the invention will become apparent on reading the detailed description of implementations and embodiments which are in no way limitative, and the following attached drawings illustrating a first preferred embodiment of the device 1 according to the invention and different steps of a first preferred embodiment of the method according to the invention implemented by this device 1.

Figure 1:
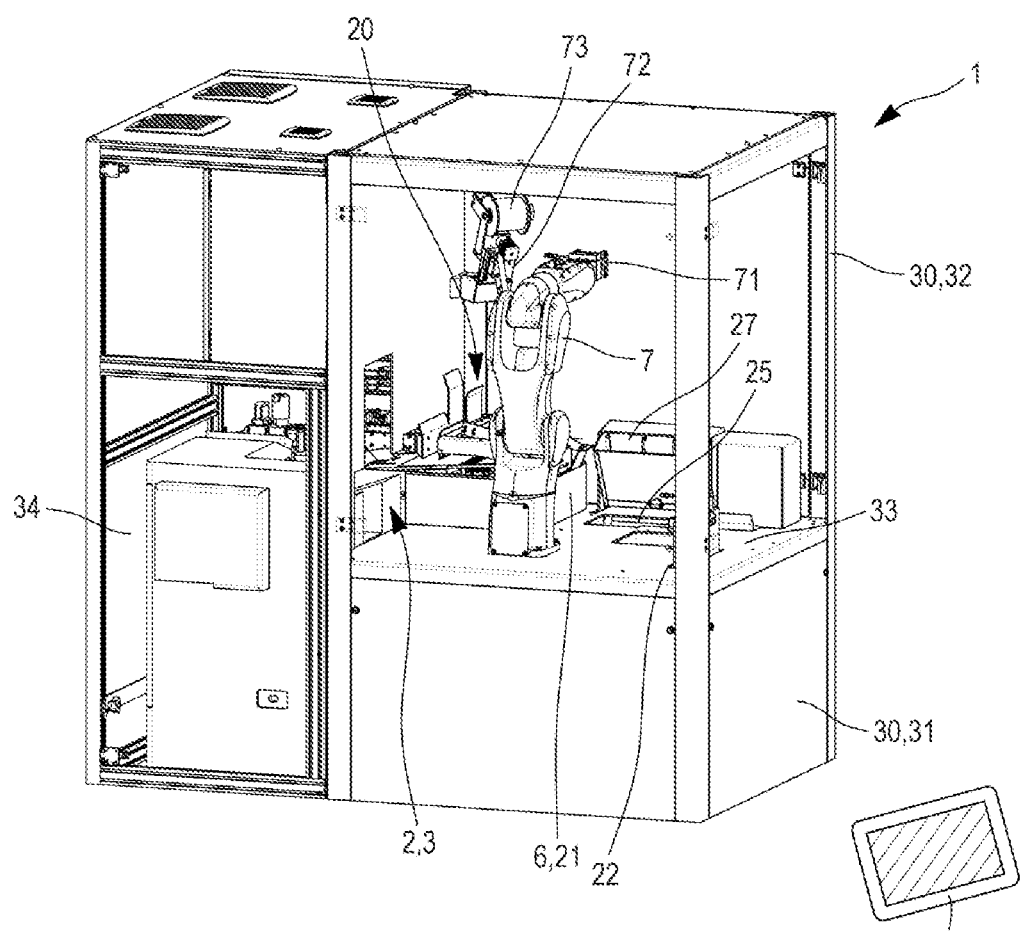
FIG. 1 is a perspective view of the device 1.

These drawings are only diagrammatic and comprise certain simplifications. For example:
  in the majority of the figures, the digits 71 of the robotic arm are shown spread apart instead of gripping the book block 5 or the cover 4 or the book 9,
  in the majority of the figures, the book block 5 or the cover 4 or the book 9 is illustrated diagrammatically, for example by a fine line in FIG. 19.

As these embodiments are in no way limitative, variants of the invention can be considered in particular comprising only a selection of the features or steps described or illustrated hereinafter, in isolation from the other features or steps described or illustrated (even if this selection is isolated within a phrase containing these other features or steps), if this selection of features or steps is sufficient to confer a technical advantage or to differentiate the invention with respect to the state of the prior art. This selection comprises at least one, preferably functional, feature or step without structural details, and/or with only a part of the structural details if this part alone is sufficient to confer a technical advantage or to differentiate the invention with respect to the state of the prior art.

DETAILED DESCRIPTION

The first embodiment of the device 1 according to the invention will be described first, with reference to FIGS. 1 to 20.

The device 1 is a device 1 for manufacturing a book 9 on demand.

The device 1 comprises input means 28:
  connected to a digital catalogue of books that can be printed and
  arranged to allow input, from the catalogue, of the book 9 to be printed by the device 1.

The input means 28 are or are not integral with the rest of the device 1. They can be connected by wireless (WiFi) or wired communication means to the rest of the device 1. The input means 28 typically comprise a touch pad or a touch screen.

The device 1 comprises a cover printing and/or receiving station 2 arranged to respectively print and/or receive a cover 4.

The station 2 comprises a printer for printing the cover 4.

The station 2 also comprises a feed tray arranged to insert, from the outside of the device 1, a cover 4 printed outside the device 1. This is useful in particular in the case of a thick hardback cover 4.

The device 1 comprises a creasing station 21.

The device 1 comprises a book block printing and/or receiving station 3 arranged to respectively print and/or receive a book block 5.

By "book block" is meant a set of several sheets (preferably of paper) stacked on top of one another to form the pages of the book 9.

The station 3 comprises a printer for printing the book block 5.

The station 3 also comprises a paper feed arranged to insert, from the outside of the device 1, a book block 5 printed outside the device 1. This is useful in particular in the case of a book block 5 on special paper or material or using special inks (gilding, etc.).

The cover printing or receiving station 2 and the book block printing or receiving station 3 comprise a printer that is common to these two stations. The stations 2 and 3 typically comprise a LEXMARK CS923 printer or equivalent.

The device 1 comprises a notch binding station 22.

The notch binding station 22 comprises a book block container 23 (arranged to receive and immobilize the book block 5) and means 24 for notch binding an edge of the book block 5 while it is arranged in the book block container 23 of the notch binding station 22.

The device 1 comprises a binding station 6 arranged to assemble the book block 5 and the cover 4.

The device 1 comprises a trimming station 25 arranged to trim the book 9.

The device 1 comprises an output station 27 arranged to remove the book 9 from the device 1, for delivering the book 9 to the user.

The device 1 comprises transport means 7 arranged and/or programmed to transport the cover 4 only, the book block 5 only, and the book 9 after assembly of the cover 4 and the book block 5, between the different stations 2, 3, 6, 21, 22, 25, 27.

In particular, the transport means 7 are arranged and/or programmed to transport the cover 4 only (without the book block 5):
from the cover printing or receiving station 2 up to the creasing station 21 (preferably without passing through any one of the other stations), and/or
from the cover printing or receiving station 2 up to the binding station 6 (preferably without passing through any one of the other stations), and/or
from the creasing station 21 up to the binding station 6 (preferably without passing through any one of the other stations), and/or
from the cover printing or receiving station 2 or the binding station 6 or the creasing station 21 up to the output station 27 (preferably without passing through any one of the other stations).

In particular, the transport means 7 are arranged and/or programmed to transport the book block 5 only (without the cover 4):
from the book block printing or receiving station 3 up to the binding station 6 (preferably without passing through any one of the other stations) or up to the notch binding station 22 (preferably without passing through any one of the other stations) or up to the trimming station 25 (preferably without passing through any one of the other stations), and/or
from the notch binding station 22 up to the binding station 6 (preferably without passing through any one of the other stations) or up to the trimming station 25 (preferably without passing through any one of the other stations), and/or
from the trimming station 25 up to the notch binding station 22 (preferably without passing through any one of the other stations) or up to the binding station 6 (preferably without passing through any one of the other stations), and/or
from the book block printing or receiving station 3 or the binding station 6 or the notch binding station 22 or the trimming station 25 up to the output station 27 (preferably without passing through any one of the other stations).

In particular, the transport means 7 are arranged and/or programmed to transport the book 9 (after assembly of the cover 4 and the book block 5):
from the binding station 6 up to the notch binding station 22 (preferably without passing through any one of the other stations) or up to the trimming station 25 (preferably without passing through any one of the other stations), and/or
from the notch binding station 22 up to the trimming station 25 (preferably without passing through any one of the other stations), and/or
from the trimming station 25 up to the notch binding station 22 (preferably without passing through any one of the other stations), and/or
from the binding station 6, notch binding station 22 or trimming station 25 up to the output station 27 (preferably without passing through any one of the other stations).

As will be seen hereinafter, said device 1 is arranged to deposit adhesive on an adhesive bonding area 8 on the reverse of the cover inside the binding station 6, before assembly or casing-in by adhesive bonding of the cover 4 on the book block 5, forming a book 9.

The transport means comprise (preferably consist of) a control unit COMM described hereinafter and a robotic arm equipped with digits 71 (at least two digits 71 forming a gripper) arranged and/or programmed (in particular by the control unit COMM) to manipulate the cover 4 and/or the book block 5.

This arm of the means 7 is typically a robotic arm having at least six axes of rotation, for example a COMAU Racer 5 or equivalent.

The transport means 7 are arranged and/or programmed to transport the book block 5 from the book block printing or receiving station 3 and up to the notch binding station 22 (optionally passing through the trimming station 25) so as to notch bind one side of the book block 5 while the book block 5 extends vertically or substantially vertically (i.e. at more or less 20°) in the station 22.

The trimming station 25 is linked to a catch tray 26, the transport means 7 being arranged and/or programmed to transport the book block 5 in an initial format, preferably A4 of international standard ISO 216 (ICS no. 85.080.10) (i.e. having a dimension of 210×297 mm), up to the trimming station 25, then hold the book block 5 in the trimming station 25 (while the book block 5 extends vertically or substantially vertically (i.e. at more or less 20°) in the station 25) for cutting into one part of the book block 5 held in the transport means 7 and another part of the book block 5 cut and directed towards the catch tray 26, then assemble, in the catch tray 26, the two parts of the book block 5 so as to form in the transport means 7 a book block 5 having a reduced format, preferably A5 of international standard ISO 216 (ICS no. 85.080.10) (i.e. having a dimension of 210×148 mm), but having an increased thickness in comparison with its initial format. These means 25 are implemented in an optional manner when the book 9 has a reduced format with respect to printing by the means 3.

The notch binding station 22 comprises one or two toothed rollers 24 arranged to notch bind (i.e. notch) the book block 5. An actuator 37 is arranged to displace each roller 24 in translation along the book block 5 held in the container 23. A guide rail 38 is arranged to guide each roller in this translation movement. Another actuator or hold-down clamp 39 is arranged to hold the book block 5 in position in the container 23 during the notch binding.

According to the variant in question:
- the transport means 7 are arranged and/or programmed to transport the book block 5 from the book block printing or receiving station 3 and up to the binding station 6 by measuring a thickness of the book block 5, for example by measuring the distance between the two digits 71 of the gripper of the arm of the means 7 holding the book block 5. This is the case for example if the book block 5 is already in the container 20 before adhesive is deposited on the cover 4; and/or
- the device 1 is arranged and/or programmed to measure a thickness of the book block 5, for example by measuring at the output of the printing station 3 (by optical or mechanical measurement, optionally with a multiplication factor ×2 in the case of future cutting in the catch tray 26). This is the case for example if the book block 5 has not yet been manipulated by the means 7 before adhesive is deposited on the cover 4; and/or
- the device 1 is arranged and/or programmed to determine a thickness of the book block 5 from a database and as a function of the book 9 selected by the user, typically according to metadata collected in a PDF file corresponding to the book block. This is the case for example if the printing of the book block 5 has still not been finished before adhesive is deposited on the cover 4.

The binding station 6 comprises a book block container 20 arranged to receive the book block 5 in a receiving position 16, in which the book block 5 preferably extends vertically or substantially vertically (i.e. at more or less 20°).

The transport means 7 are arranged and/or programmed to transport the book block 5 from the notch binding station 22 up to the binding station 6 (more precisely up to the container 20).

The transport means 7 are arranged and/or programmed to transport the cover 4 from the printing station 2 up to the creasing station 21.

The transport means 7 are arranged and/or programmed to insert the cover in the creasing station in a creasing position 11, in which the cover 4 preferably extends vertically or substantially vertically (i.e. at more or less 20°).

The creasing station 21 is arranged to carry out a pre-folding of the cover or to crease the cover 4 (before any adhesive is deposited on the cover 4) along several parallel fold lines extending over the entire width or length of the cover 4 (preferably on the back of the cover), preferably along two or four parallel fold lines. At least two of these parallel fold lines are in the adhesive bonding area 8.

The creasing station 21 comprises, according to the variant in question:
- a blade 41, a stop 42, and an actuator 43 arranged to displace the blade 41 so as to trap the cover 4 between the blade 41 and the stop 42 so as to produce a fold line in the cover 4 along the blade 41. In this case the cover 4 is offset in the station for each fold line to be produced;
- several blades 41, a stop 42, and an actuator 43 arranged to displace the blades 41 so as to trap the cover 4 between the blades 41 and the stop 42 so as to simultaneously produce several (typically two or four) parallel fold lines in the cover 4 along the blades 41. In this case the cover 4 only traces a single creasing position 11.

The transport means 7 are arranged and/or programmed to transport the cover 4 from the creasing station 21 up to the binding station 6.

The binding station 6 comprises heating means 10 arranged to heat and/or maintain at a heated temperature adhesive deposited on the adhesive bonding area 8 of the cover 4 before assembly or casing-in of the cover 4 and the book block 5 by adhesion.

The transport means 7 are arranged and/or programmed to position the cover 4 in several positions in the binding station 6, successively in this order:
- deposition position 12, in which the cover 4 preferably extends horizontally or substantially horizontally (i.e. at more or less 20°), then
- heating position 13, in which the cover 4 preferably extends horizontally or substantially horizontally (i.e. at more or less 20°), then
- pre-assembly position 14, in which the cover 4 preferably extends horizontally or substantially horizontally (i.e. at more or less 20°), then
- assembly position 15, in which the cover 4 preferably extends horizontally or substantially horizontally (i.e. at more or less 20°).

The transport means 7 are arranged and/or programmed to position the cover 4 in the deposition position 12 in which the adhesive bonding area 8 is not located under the heating means 10 and in which the device 1 is arranged to deposit the adhesive on the adhesive bonding area 8. In this position 12 the heating means 10 are inactive.

In this deposition position 12, the cover 4 rests on a horizontal or substantially horizontal (i.e. at more or less 20°) support surface of the binding station 6.

The binding station 6 comprises clamping means 18 arranged to immobilize the cover 4 in the deposition position 12.

The device 1 comprises an adhesive applicator gun 72.

The robotic arm of the means 7 is arranged and/or programmed to grip the adhesive applicator gun 72 to deposit adhesive on the adhesive bonding area 8 of the cover 4 while the cover 4 is placed flat in the binding station 6 in its deposition position 12.

The adhesive applicator gun 72 comprises:
- an adhesive reserve 73 comprising a thread of solid adhesive wound in the form of a coil,
- means for unwinding the thread from the coil by an end of this thread and for melting this end of the adhesive thread so as to deliver the adhesive in a liquid or paste form onto the adhesive bonding area 8; these means typically comprise an unwinding system and a melting machine. The unwinding system comprises a roller that is free in rotation and a toothed wheel driven in rotation by a motor, the roller and the toothed wheel gripping the adhesive thread between the coil and the melting machine. The unwinding system is arranged to draw the thread coming from the coil and push it towards the melting machine so as to thread the adhesive thread into the melting machine. The melting machine is heated and temperature-regulated. The melting machine is arranged to melt adhesive thread. The melting machine comprises a heated mass (typically a copper alloy of the tin type or other) in the form of a funnel, the output diameter of this funnel (approximately 1 mm) being smaller than the diameter of the adhesive thread in the solid state on its coil.

The adhesive is for example PLANATOL Planamelt W adhesive or equivalent, bought in the form of granules and extruded in the form of a thread wound in the form of the coil 73.

The device 1, more precisely the arm of the means 7, is arranged and/or programmed to deposit (and optionally to determine beforehand) a quantity of adhesive on the adhesive bonding area 8 of the cover 4 inside the binding station 6, this quantity of adhesive being a function of the measured or determined thickness of the book block 5, typically according to the metadata collected in a PDF file corresponding to the book block translated into deposition of adhesive.

The transport means 7 are arranged and/or programmed to position the cover 4 in the heating position 13 so that the adhesive bonding area 8 is located under the heating means 10, such that the deposited adhesive is located between the cover 4 and the heating means 10. The heating means 10 comprise:

means 201 for generating heat; these means 201 typically comprise means for generating a current of hot air and/or means for generating heat radiation, for example they comprise an infrared lamp or a heating resistor; these means 201 are typically arranged to generate a temperature above 100° C. (or even 150° C.) and/or below 300° C. at the area 8 when the cover 4 is in its heating position 13; these means 201 are typically arranged to be at a distance of more than 10 mm and/or less than 50 mm from the area 8 when the cover 4 is in its heating position 13; these means 201 typically comprise a heating resistor arranged at a distance of 30 mm from the area 8 when the cover 4 is in its heating position 13 and the temperature of which is slightly above 170° C. so as to heat to 170° C. the area 8 slightly distant when the cover 4 is in its heating position 13;

a mouth 202 (typically made from stainless steel or ideally made from a thermally insulating material such as mica) arranged to limit the extent of the diffusion of this heat in the direction of the adhesive bonding area 8 in the heating position 13 of the cover 4, a controller (comprising the control unit COMM) arranged and/or programmed to control an opening of the mouth 202 (the mouth 202 comprising two flaps) as a function of a quantity and/or a width of adhesive deposited on the adhesive bonding area 8 and/or as a function of a thickness of the book block 5. This controller can be dispensed with, in particular if the heat generated by the means 201 is not too significant.

A particular arrangement of the means 10 (more specifically of each of the means 201 and 202) is noted in FIGS. 4, 6, 8, 13 and 14.

The means 10 (more specifically each of the means 201 and 202) are located above the cover 4 in the deposition position 12 of the cover 4.

The means 10 (more specifically each of the means 201 and 202) are located above the cover 4 in the heating position 13 of the cover 4.

The means 10 (more specifically each of the means 201 and 202) are located above the adhesive bonding area 8 in the heating position 13 of the cover 4.

The device 1 (more precisely the means 7) is thus arranged to deposit adhesive on the cover 4 so that this deposited adhesive is located between:

on the one hand, the cover 4 in its deposition position 12 or the cover 4 in its heating position 13 or the adhesive bonding area 8 in the heating position 13 of the cover 4 and, on the other hand, the means 10 (more specifically each of the means 201 and 202).

In other words, the deposition position 12 or the heating position 13 or the adhesive bonding area 8 in the heating position 13 of the cover 4 is located between:

on the one hand, the support surface or plate in the deposition position 12, or heating position 13, and, on the other hand, the means 10 (more specifically each of the means 201 and 202).

Thus, the adhesive is heated, not through the cover 4, but directly above the cover 4 so that the heat originating from the means 10 (more precisely the means 201) reaches the adhesive deposited on the cover by the means 7 without passing through the cover 4 beforehand. Thus, deterioration or burning of the cover 4 is avoided. Thus, the quantity of heat received by the adhesive is maximized in comparison with the quantity of heat received by the cover 4.

In the heating position 13, the adhesive bonding area 8 is situated, out of the two faces of the cover 4, on the face of the cover oriented towards the means 10 (more specifically towards each of the means 201 and 202).

The clamping means 18 are arranged to immobilize the cover 4 in the heating position 13.

The clamping means 18 comprise the mouth 202 of the heating means 10 which are mounted so as to be movable between two positions, including: a position in which the cover 4 is not immobilized by the mouth 202 and a position in which the cover 4 is immobilized by the mouth 202.

The transport means 7 are arranged and/or programmed to position the cover 4 in the pre-assembly position 14 in which the adhesive bonding area 8 is not located under the heating means 10.

The heating position 13 is offset with respect to the deposition position 12 in an offset direction 17, preferably horizontal or substantially horizontal (i.e. at more or less 20°).

The deposition position 12 is offset with respect to the creasing position 11 at least in the offset direction 17.

More precisely, the deposition position 12 is offset with respect to the creasing position 11 in the offset direction 17 and at an angle, preferably 90° or substantially equal to 90° (i.e. at more or less 20°).

In other words, the deposition position 12 is offset with respect to the creasing position 11 by:

a translation of the cover 4 (by the means 7) in the offset direction 17, and a rotation of the cover 4 (by the means 7) so that in its creasing position 11, the cover 4 extends perpendicularly or substantially perpendicularly (i.e. at more or less 20°) to the cover 4 in its deposition position 12.

The space occupied by the cover 4 in its creasing position 11 intersects the space occupied by the cover 4 in its deposition position 12.

In its creasing position 11, the cover 4 extends perpendicularly or substantially perpendicularly (i.e. at more or less 20°) to the cover 4 in its deposition position 12.

The pre-assembly position 14 is offset with respect to the heating position 13 in this offset direction 17.

The cover 4 is located in one and the same plane, called adhesive bonding plane 19, (preferably horizontal or substantially horizontal (i.e. at more or less)) 20° in these deposition 12, heating 13 and pre-assembly 14 positions.

The binding station 6 is arranged and/or programmed to position the cover 4 in the assembly position 15. For this, the binding station 6 comprises a pin joint 45 (illustrated by passing between FIGS. 4 and 6) arranged to cause the surface for supporting the cover 4 to pivot between its positions 14 and 15. This pin joint 45 is actuated by an actuator 46.

The assembly position 15 is offset with respect to the pre-assembly position 14 at least partly perpendicularly (preferably obliquely) to the offset direction 17 and to the adhesive bonding plane 19 so as to be able to assemble the cover 4 and the book block 5 by adhesion via the adhesive bonding area 8 on which the adhesive has been deposited.

The transport means 7 are arranged and/or programmed so that in the deposition position 12 the adhesive bonding area 8 is not located under the book block container 20 of the binding station 6.

The transport means 7 are arranged and/or programmed so that in the pre-assembly position 14 the adhesive bonding area 8 is located under the book block container 20 of the binding station 6.

In its receiving position 16, the book block 5 extends perpendicularly or substantially perpendicularly (i.e. at more or less 20°) to the cover 4 in its pre-assembly position 14 and in its assembly position 15.

The transport means 7 are arranged and/or programmed to remove the book 9 from the binding station 6 perpendicularly or substantially perpendicularly (i.e. at more or less 20°) to the offset direction 17 (and parallel or substantially parallel (i.e. at more or less 20°) to the adhesive bonding plane 19) and touching only the book block 5, i.e. holding the book by the "fore-edge".

The transport means 7 are arranged and/or programmed to:
- transport the assembled book 9 from the binding station 6 and up to the book block container 23 of the notch binding station 22 touching only the book block 5,
- then drop the book 9 in the book block container 23 of the notch binding station 22, while the book 9 extends vertically or substantially vertically (i.e. at more or less 20°)
- then change grip by gripping the book 9 by at least a part of the cover 4 adhesively bonded to the book block 5.

The transport means 7 are arranged and/or programmed to transport the book 9 from the notch binding station 22 and up to the trimming station 25.

The trimming station 25 is arranged to cut the book 9 along three cutting lines corresponding to three edges of the book 9, the fourth edge of the book 9 corresponding to the edge for adhesion of the book block 5 to the cover 4 by the adhesive bonding area 8. Each cutting line is produced while the book 9 extends vertically or substantially vertically (i.e. at more or less 20°) in the station 25.

The trimming station 25 comprises a blade 51, a stop 54, a motor 52 arranged to actuate the blade 51 against the stop 54 (via gears 53) so as to trap the book 9 (or the book block 5 in the case of cutting to pass from A4 to A5) between the stop 54 and the blade 51 and thus cut an edge of the book 9.

The device 1 comprises a casing 30 enclosing all of the stations. The casing 30 comprises:
- a lower part 31 that is entirely opaque (by "opaque" is meant that the human eye cannot see through it and/or it allows less than 1% of the light intensity of each wavelength between 400 and 700 nm to pass through),
- an upper part 32 equipped with a transparent window and located above the lower part 31 (by "transparent" is meant that the human eye can see through it and/or it allows at least 50% of the light intensity of at least one wavelength between 400 and 700 nm to pass through),
- a side part 34 (preferably entirely opaque) laterally adjoining the lower part 31 and the upper part 32.

The device 1 comprises a control unit COMM (not shown), preferably located in the side part 34.

This control unit comprises at least one computer, a central processing or calculation unit, a (preferably dedicated) analogue electronic circuit, a (preferably dedicated) digital electronic circuit, and/or a (preferably dedicated) microprocessor, and/or software means.

This control unit is arranged to:
- communicate with the input means 28, in particular to receive the instruction for the book 9 to be printed selected on the input means 28 by the user, and
- control the means 7 and each of the stations 2, 3, 6, 21, 22, 25 to implement the method according to the invention described hereinafter so as to manufacture this book 9, in particular to print the book block 5 and the cover 4 corresponding to this book 9.

The lower part 31 and the upper part 32 are separated by a separator plate 33 that is opaque (but equipped with through holes or slots).

The plate 33 is horizontal or substantially horizontal (i.e. at more or less) 20°.

The robotic arm of the means 7 is located at least partly in the upper part 32.

The binding station 6 is located at least partly in the upper part 32.

The creasing station 21 is located at least partly in the upper part 32.

The notch binding station 22 is located at least partly in the lower part 31 and is accessible from the upper part 32 by the book block 5 or the book 9 manipulated by the arm of the means 7 through a slot made in the separator plate 33.

The trimming station 25 is located at least partly in the lower part 31 and is accessible from the upper part 32 by the book block 5 or the book 9 manipulated by the arm of the means 7 through a slot made in the separator plate 33.

The book block printing or receiving station 3 is located at least partly in the upper part 32 and/or in the side part 34.

The cover printing or receiving station 2 is located at least partly in the upper part 32 and/or in the side part 34.

The output station 27 (typically comprising a simple hatch) is located at least partly in the upper part 32.

The first embodiment of the method according to the invention implemented in the device 1 according to the invention will now be described with reference to FIGS. 1 to 21.

As this embodiment is in no way limitative, variants can be considered in particular comprising only a selection of the steps described or illustrated hereinafter, and/or for each of these steps, a selection of the features of these steps described or illustrated hereinafter (even if this selection is isolated within a phrase containing these other features or steps), if this selection of features or steps is sufficient to confer a technical advantage or to differentiate the invention with respect to the state of the prior art.

This embodiment of the method according to the invention comprises the steps 99 to 135 described hereinafter.

Steps 101 to 114 follow one another in time as the numbers increase.

Steps 100 and 115 to 119 follow one another in time as the numbers increase.

Steps 121 to 135 follow one another in time as the numbers increase.

Each of the steps 121 to 135 is implemented after the block of steps 100 and 115 to 119 and after the block of steps 101 to 114.

In this embodiment, steps 101 to 135 follow one another in time as the numbers increase.

Step 100 is implemented:
before step 115, and
before and/or after and/or during step 101, preferably between and/or during steps 102 to 114, preferably between and/or during steps 102 to 109.

During or between these different steps, this embodiment of the method according to the invention comprises transporting, by the transport means 7, the cover 4 and/or the book block 5 between the different stations 2, 3, 6, 21, 22, 25, 27. The transport means 7 comprise the robotic arm of the means 7 equipped with digits 71 manipulating the cover 4 and/or the book block 5 in order to transport it between the different stations 2, 3, 6, 21, 22, 25, 27.

Figure 21:
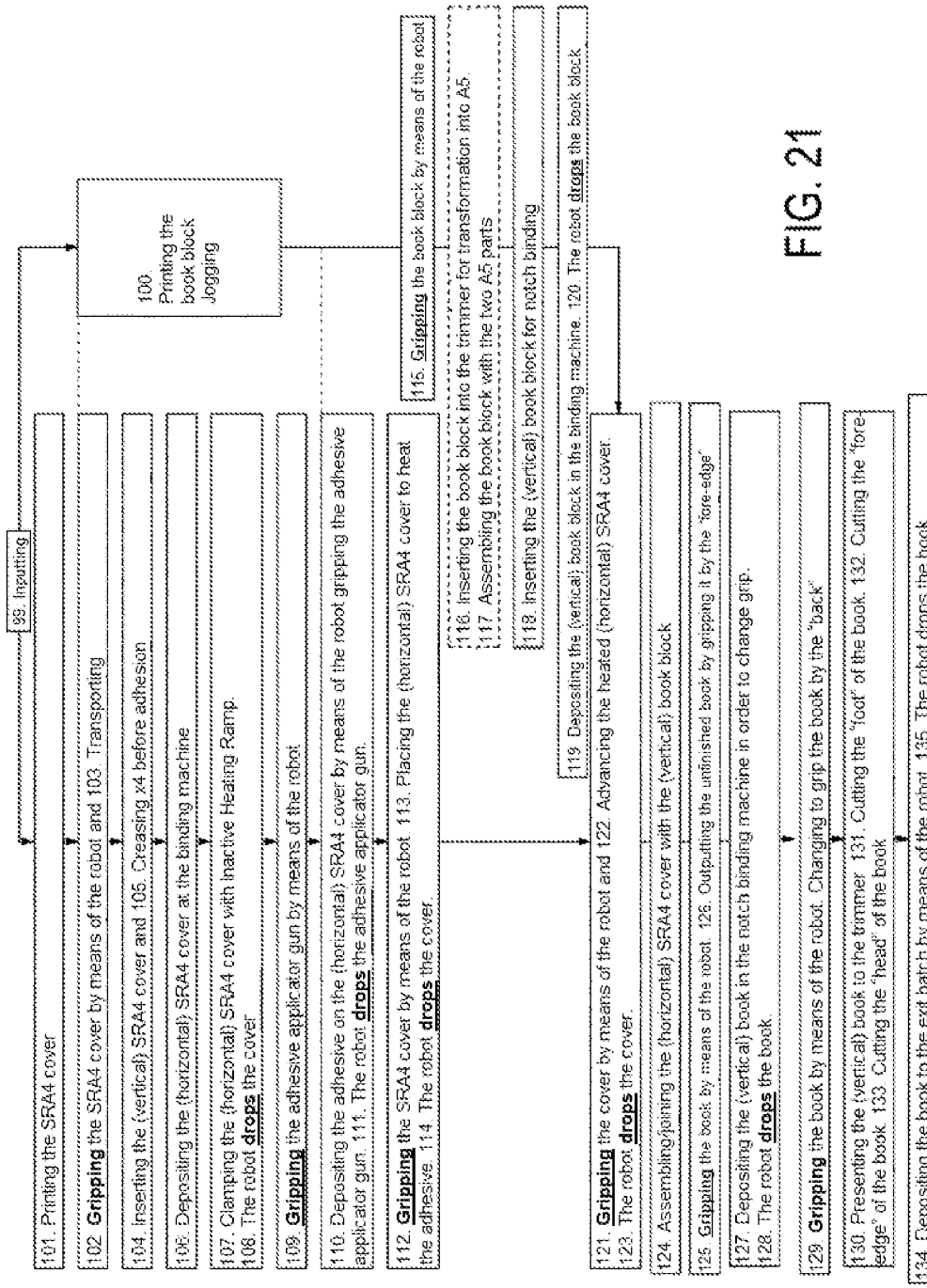
FIG. 21 is a flow chart of the first embodiment of the method according to the invention.

These means 7 are also called "robot", in particular in FIG. 21.

This embodiment of the method according to the invention for manufacturing a book 9 on demand initially comprises the step 99 of inputting, by the user, on the input means 28, the book 9 to be printed.

After step 99, this embodiment of the method according to the invention comprises the step 100 of printing or receiving, respectively at the book block printing or receiving station 3, the book block 5. In the case of printing the book block 5, this embodiment of the method also comprises jogging the book block, typically at the output of the printer 3.

Figure 2:
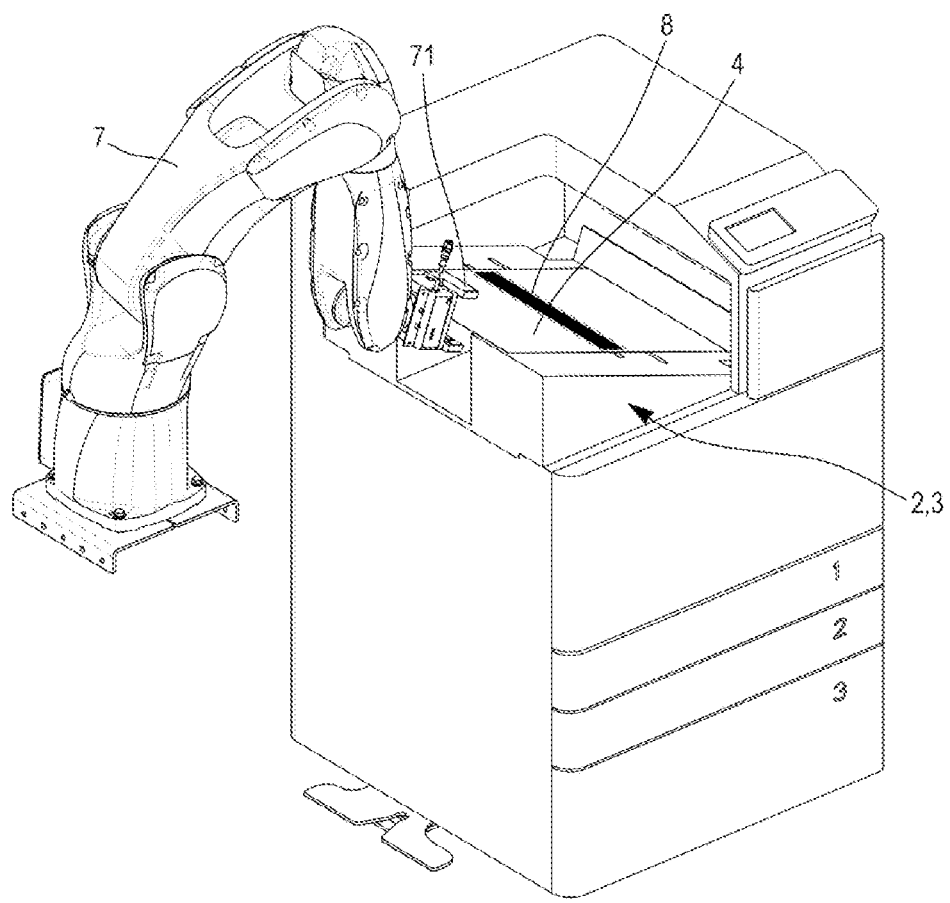
FIG. 2 is a perspective view of the robotic arm of the means 7 and the printing means 2, 3 of the device 1 when the cover 4 has just been printed.
Figure 3:
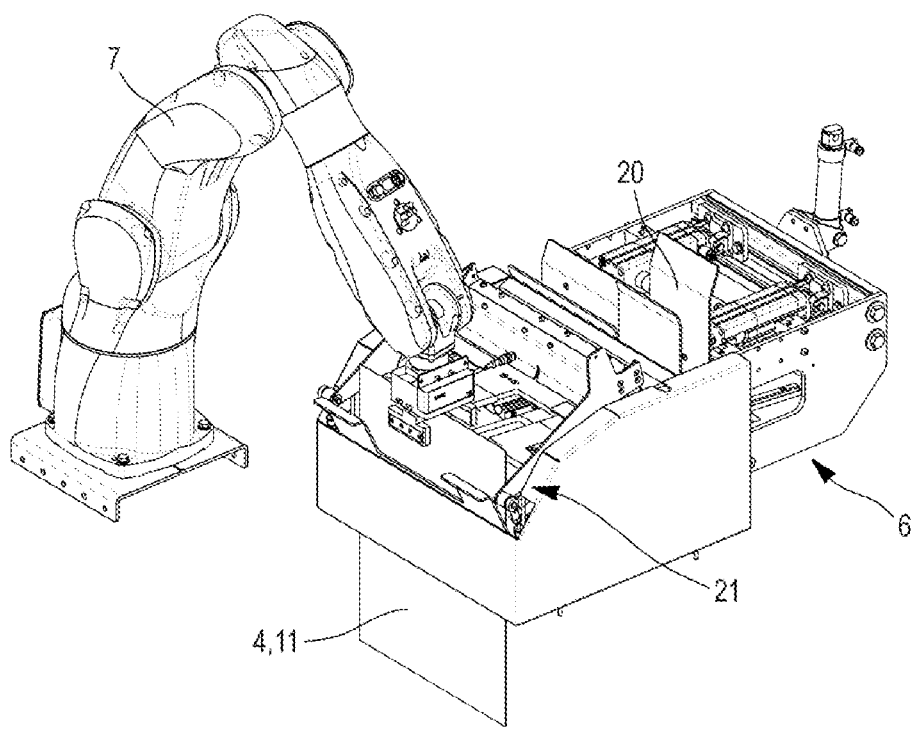
FIG. 3 is a perspective view of the robotic arm of the means 7, of the creasing station 21 and of the binding station 6 of the device 1 while the cover 4 is in its creasing position 11.
Figure 4:
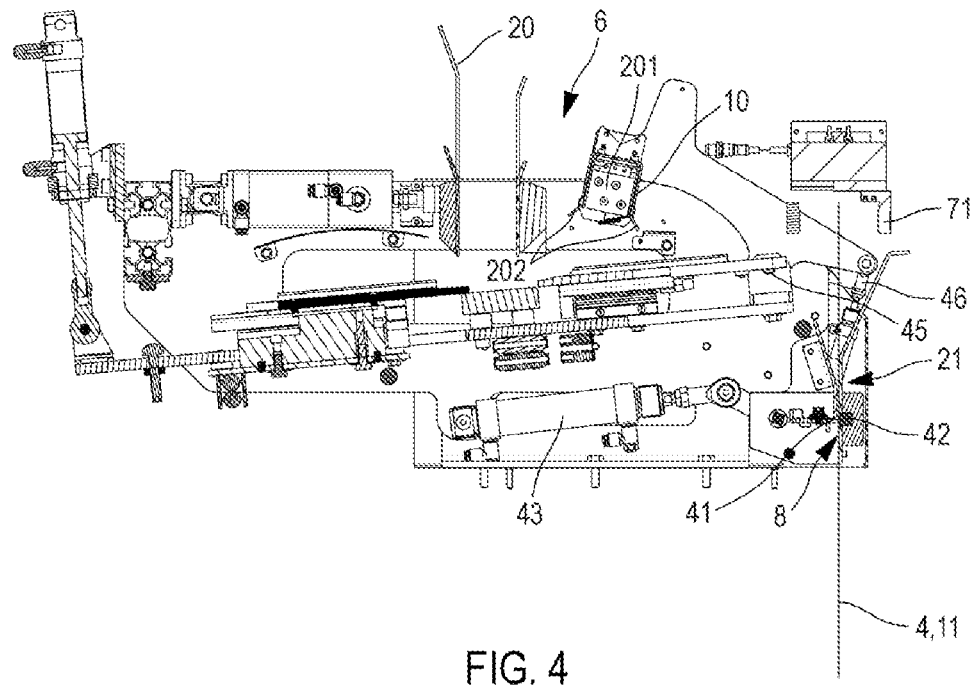
FIG. 4 is a cross-section profile view of the digits 71 of the robotic arm of the means 7, of the creasing station 21 and of the binding station 6 of the device 1 while the cover 4 is in its creasing position 11.
Figure 5:
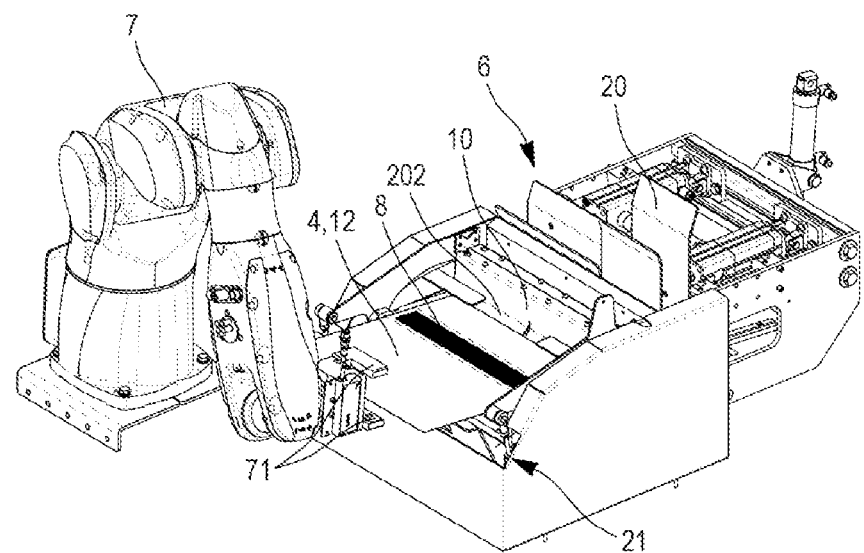
FIG. 5 is a perspective view of the robotic arm of the means 7, of the creasing station 21 and of the binding station 6 of the device 1 while the cover 4 is in its deposition position 12.
Figure 6:
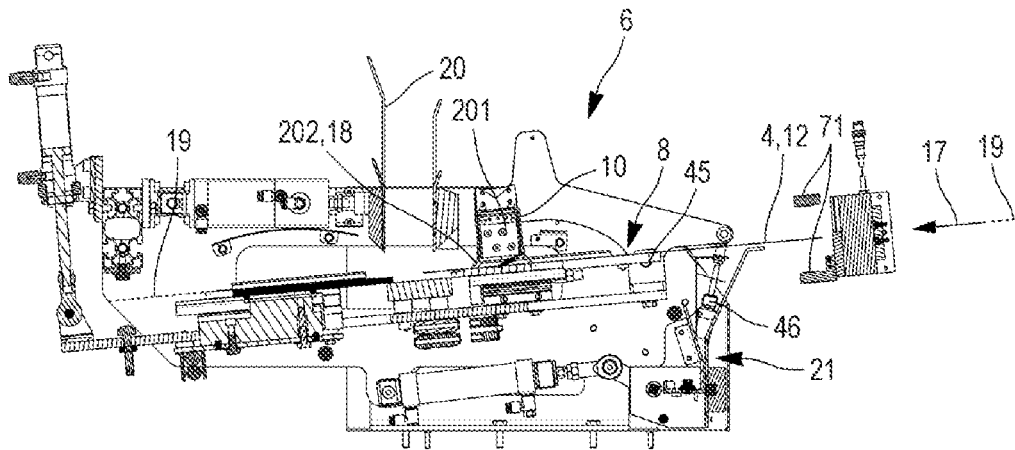
FIG. 6 is a cross-section profile view of the digits 71 of the robotic arm of the means 7, of the creasing station 21 and of the binding station 6 of the device 1 while the cover 4 is in its deposition position 12.
Figure 7:
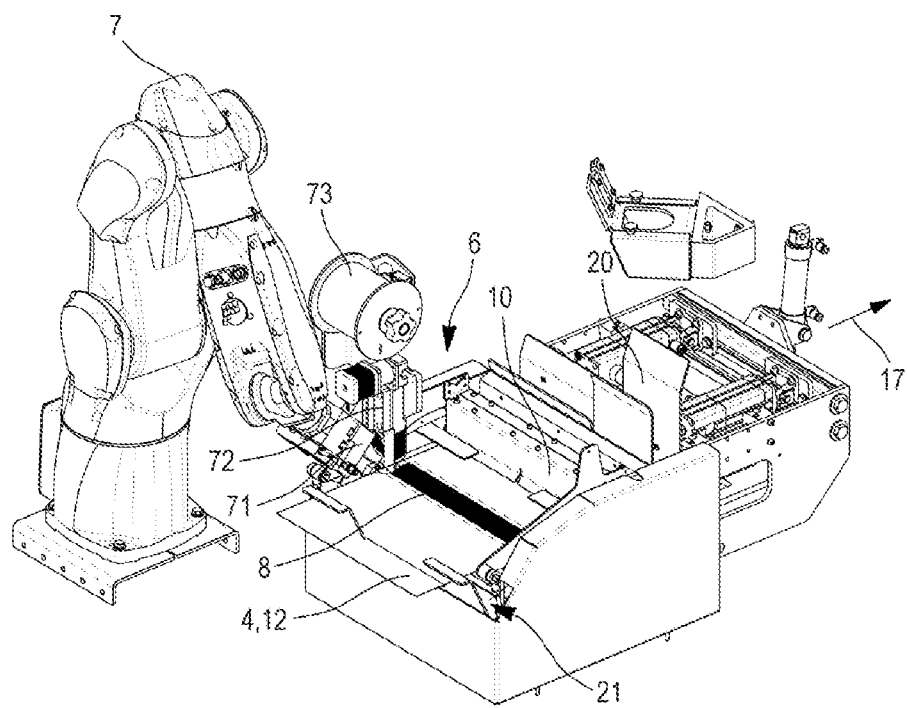
FIG. 7 is a perspective view of the robotic arm of the means 7 manipulating an adhesive applicator gun 72, of the creasing station 21 and of the binding station 6 of the device 1 while the cover 4 is in its deposition position 12.
Figure 8:
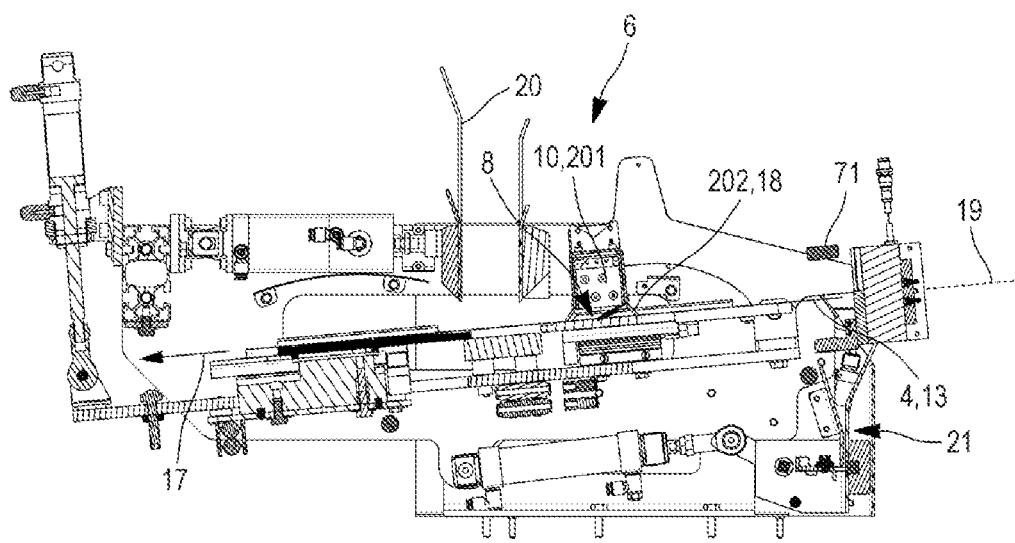
FIG. 8 is a cross-section profile view of the digits 71 of the robotic arm of the means 7, of the creasing station 21 and of the binding station 6 of the device 1 while the cover 4 is in its heating position 13.

After step 99, this embodiment of the method according to the invention also comprises the following successive steps:

step 101: printing or receiving, respectively at the cover printing or receiving station 2, the cover 4; then step 102: the means 7 (more precisely the arm of the means 7) grip the cover 4, as illustrated in FIG. 2; then step 103: the means 7 (more precisely the arm of the means 7) transport the cover 4 from the cover printing or receiving station 2 to the creasing station 21; then step 104: the means 7 (more precisely the arm of the means 7) (vertically) insert the cover 4 in the creasing station 21, as illustrated in FIGS. 3 and 4, the transport means 7 inserting the cover 4 in the creasing station 21 in the creasing position 11; then step 105: creasing (or pre-folding), by means of the creasing station 21, the cover 4 (before the adhesive is deposited) along several parallel fold lines extending over the entire width or length of the cover 4 (preferably on the back of the cover), preferably along two or four parallel fold lines. The spacing between these parallel lines depends on the thickness of the book block 5, measured or determined beforehand as explained below in the paragraph for step 110; then step 106: the means 7 (more precisely the arm of the means 7) position the cover 4 in the deposition position 12 in which the adhesive bonding area 8 is not located under the heating means 10, as illustrated in FIG. 5; the adhesive bonding area 8 is not located under the book block container 20 of the binding station 6 when the cover 4 is in its deposition position 12; the deposition position 12 is offset with respect to the creasing position 11 in the offset direction 17; the space occupied by the cover 4 in its creasing position 11 intersects the space occupied by the cover 4 in its deposition position 12; in its creasing position 11 the cover 4 extends perpendicularly or substantially perpendicularly (i.e. at more or less 20°) to the cover 4 in its deposition position 12; then step 107: immobilizing, by the clamping means 18, the cover 4 in the deposition position 12 as illustrated in FIG. 6, at least until the future step 110 including deposition of adhesive; then step 108: the means 7 (more precisely the arm of the means 7) drop the cover 4 in its deposition position 12; then step 109: gripping, by means of the robotic arm of the means 7, the adhesive applicator gun 72 as illustrated in FIG. 7; then step 110: depositing adhesive, by means of the robotic arm of the means 7 gripping the gun 72, on the adhesive bonding area 8 of the cover 4 inside the binding station 6 before assembly or casing-in (future step 124) of the cover 4 and the book block 5 by adhesion, forming the book 9; more precisely depositing adhesive from the applicator gun 72 on the adhesive bonding area 8 of the cover 4 while the cover 4 is placed flat in the binding station 6 in its deposition position 12; the adhesive applicator gun 72 comprises the adhesive reserve 73 comprising the thread of solid adhesive wound in the form of a coil, this embodiment of the method according to the invention comprising an unwinding of the thread from the coil by an end of this thread and a step in which this end of the thread of adhesive is melted so as to deliver the adhesive in liquid or paste form on the adhesive bonding area 8; this embodiment of the method according to the invention comprises, before this deposition of a certain quantity of adhesive on the adhesive bonding area 8 of the cover 4 inside the binding station 6, determining this quantity of adhesive, this quantity of adhesive being a function of the measured or determined thickness of the book block 5, typically according to the metadata collected in a PDF file corresponding to the book block translated into deposition of adhesive. This thickness of the book block 5 was measured and/or determined beforehand in this method:

for example by measuring the distance between the two digits 71 of the gripper of the arm of the means 7 holding the book block 5; and/or for example by measuring at the output of the station 3 by optical or mechanical measurement, for example after or during the jogging (optionally with a multiplication factor ×2 in the case of future cutting in the catch tray 26 in the optional steps 116 and 117); and/or from a database and as a function of the book 9 selected by the user, typically according to metadata collected in a PDF file corresponding to the book block; then step 111: the means 7 (more precisely the arm of the means 7) drop the adhesive applicator gun 72 and puts it away in its support inside the casing 30, 32; then step 112: the means 7 (more precisely the arm of the means 7) grip the cover 4, and the means 18 stop immobilizing the cover 4; then step 113: the transport means 7 position the cover 4 in the heating position 13 in which the adhesive bonding area 8 is located under the heating means 10 such that the adhesive deposited is located between the cover 4 and the heating means 10, the heating position 13 being offset with respect to the deposition position 12 in the offset direction 17; the means 18 immobilize the cover 4 in its position 13 as illustrated in FIG. 8, the means 18 moves together with the heating means 10; during this step 113 and until step 121, this embodiment of the method according to the invention comprises heating or maintaining at a heated temperature, by the heating means 10, the adhesive deposited on the adhesive bonding area 8 of the cover 4 before assembly or casing-in (future step 124) of the cover 4 and the book block 5 by adhesion; the adhesive bonding area 8 is not located under the book block container 20 of the binding station 6 when the cover 4 is in its heating position 13; the heating or maintaining at a heated temperature comprises:

- generating heat by the heating means 10, more precisely by the means 201,
- limiting, by means of the mouth 202, an extent of the diffusion of this heat in the direction of the adhesive bonding area 8 in the heating position 13 of the cover 4,
- controlling, by means of the controller COMM, an opening of the mouth 202 as a function of a quantity and/or a width of adhesive deposited on the adhesive bonding area 8 and/or as a function of a thickness (determined or measured) of the book block 5.

Figure 9:
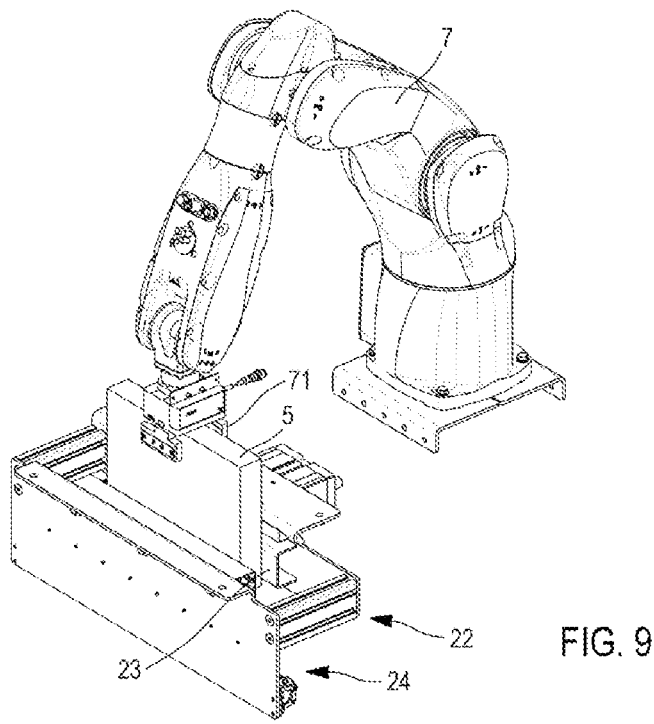
FIG. 9 is a perspective view of the robotic arm of the means 7 and of the notch binding station 22 of the device 1 while the book block 5 is inserted in the notch binding station 22.
Figure 10:
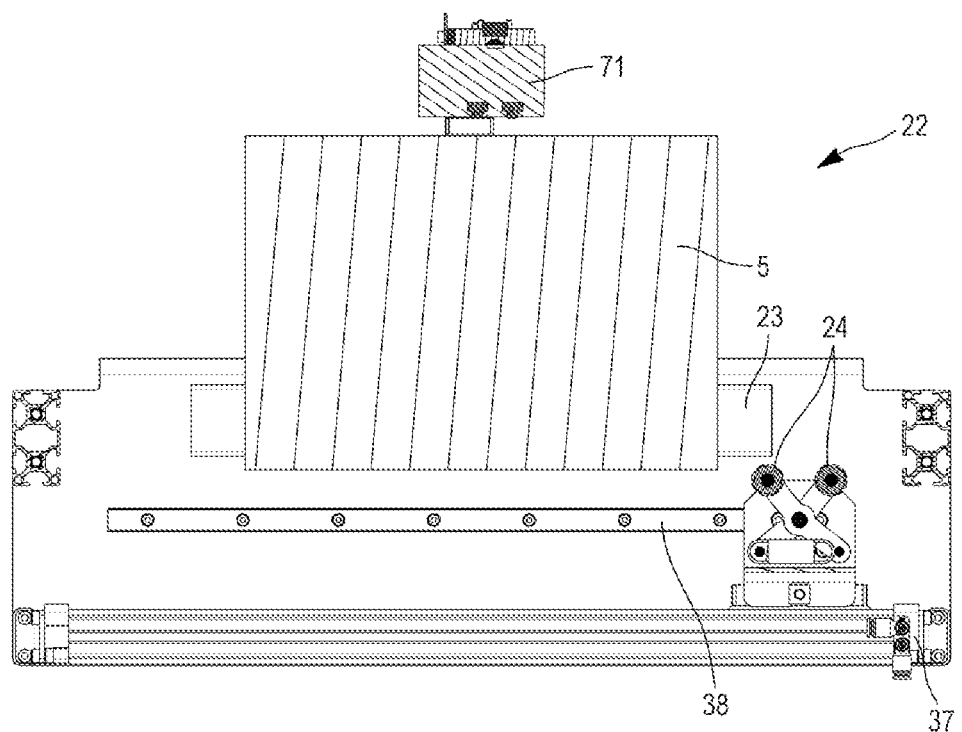
FIG. 10 is a cross-section profile view of the digits 71 of the robotic arm of the means 7 and of the notch binding station 22 of the device 1 while the book block 5 is inserted in the notch binding station 22.
Figure 11:
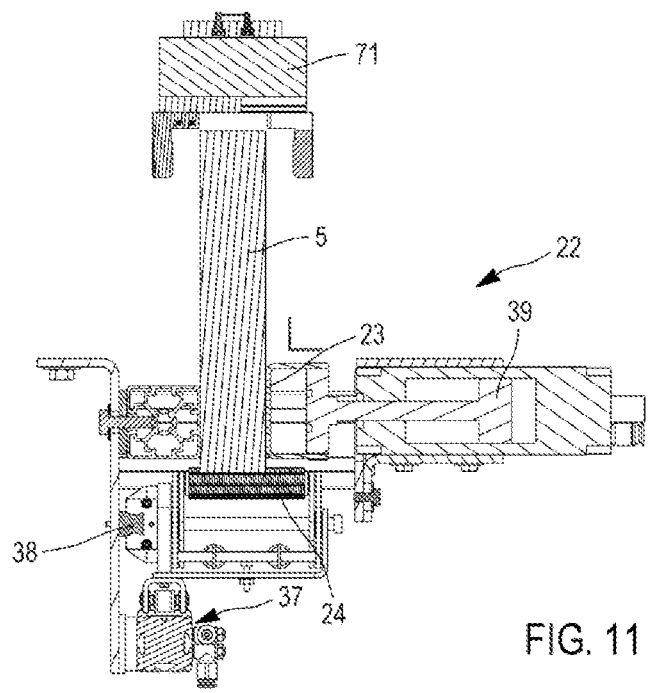
FIG. 11 is another cross-section profile view (in a plane perpendicular to that in FIG. 10) of the digits 71 of the robotic arm of the means 7 and of the notch binding station 22 of the device 1 while the book block 5 is inserted in the notch binding station 22.
Figure 12:
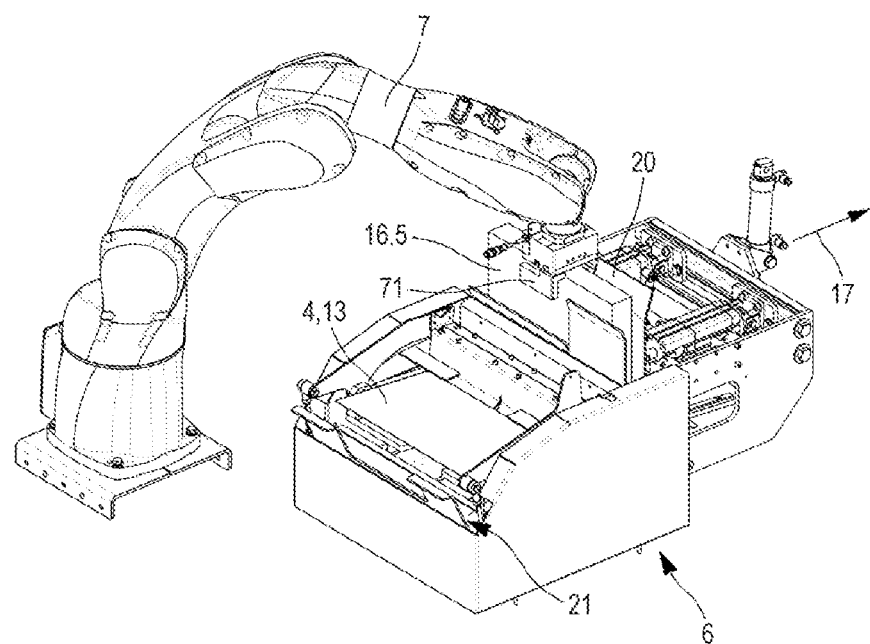
FIG. 12 is a perspective view of the robotic arm of the means 7, of the creasing station 21 and of the binding station 6 of the device 1 while the cover 4 is in its heating position 13 and while the book block 5 is inserted in the book block container 20 of the binding station 6.
Figure 13:
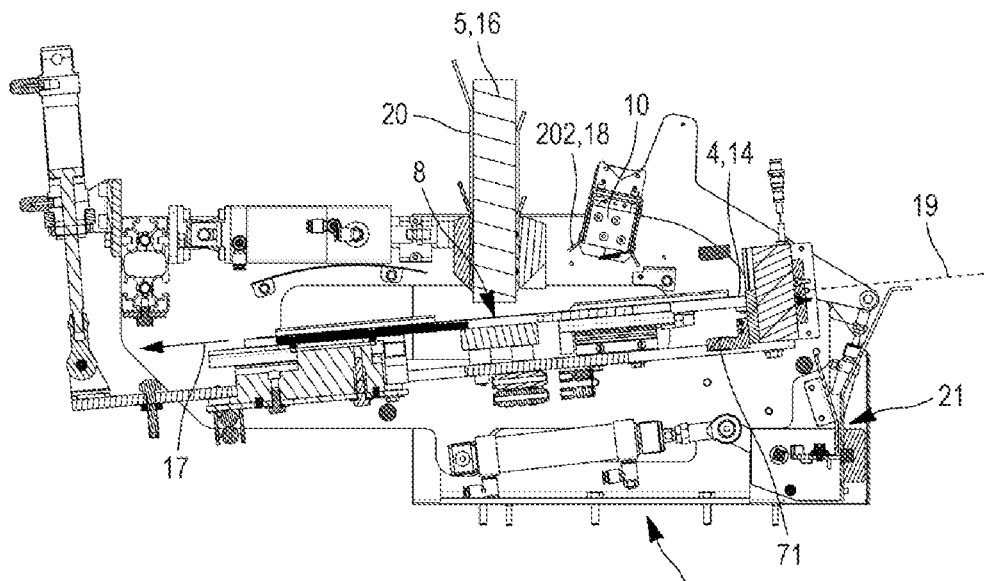
FIG. 13 is a cross-section profile view of the digits 71 of the robotic arm of the means 7, of the creasing station 21 and of the binding station 6 of the device 1 while the cover 4 in it its pre-assembly position 14 and while the book block 5 is inserted in the book block container 20 of the binding station 6.
Figure 14:
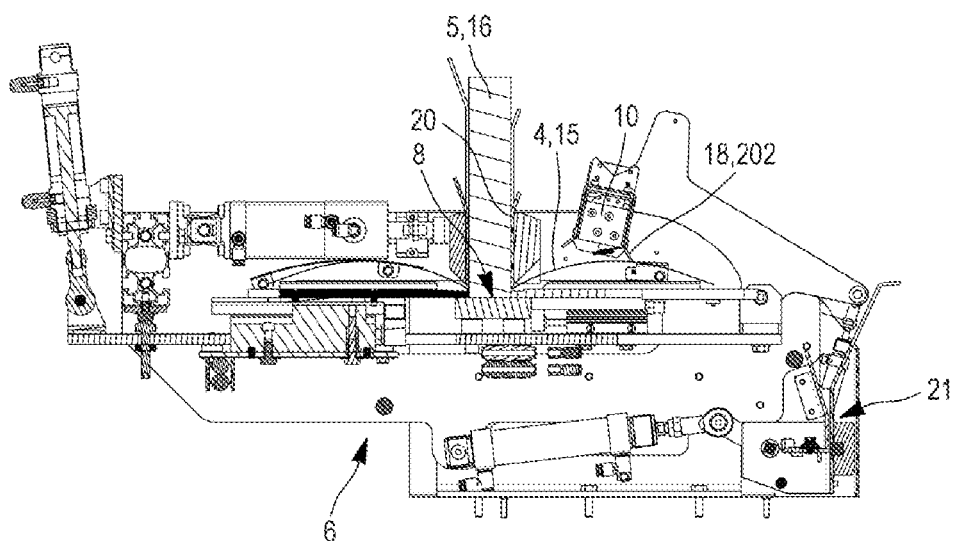
FIG. 14 is a cross-section profile view of the creasing station 21 and of the binding station 6 of the device 1 while the cover 4 is in its assembly position 15 and while the book block 5 is inserted in the book block container 20 of the binding station 6.
Figure 15:
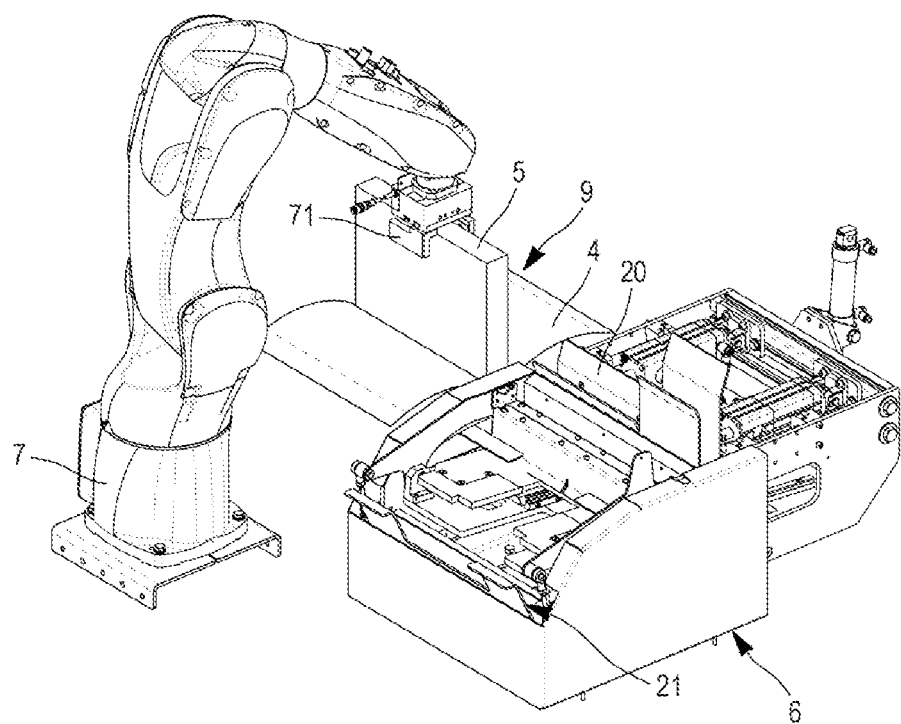
FIG. 15 is a perspective view of the robotic arm of the means 7, of the creasing station 21 and of the binding station 6 of the device 1 while the book 9, after assembly of the cover 4 and the book block 5, is extracted from the binding station 6.
Figure 16:
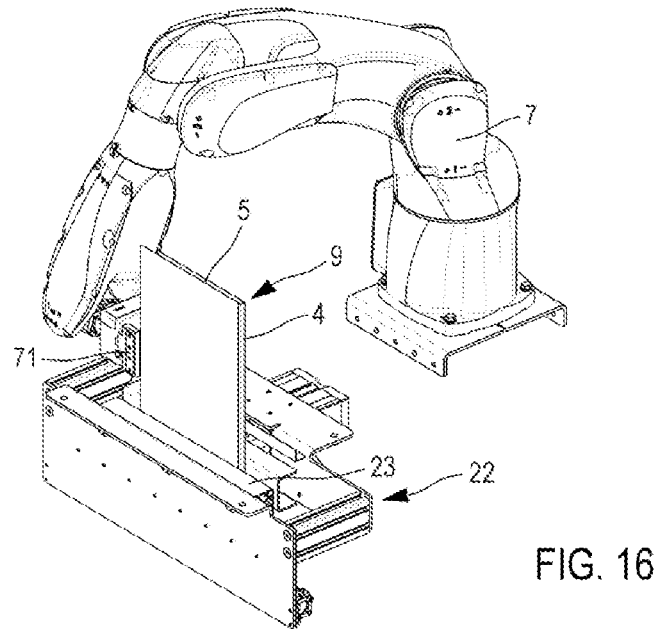
FIG. 16 is a perspective view of the robotic arm of the means 7 and of the notch binding station 22 of the device 1 while the book 9 is inserted in the notch binding station 22.
Figure 17:
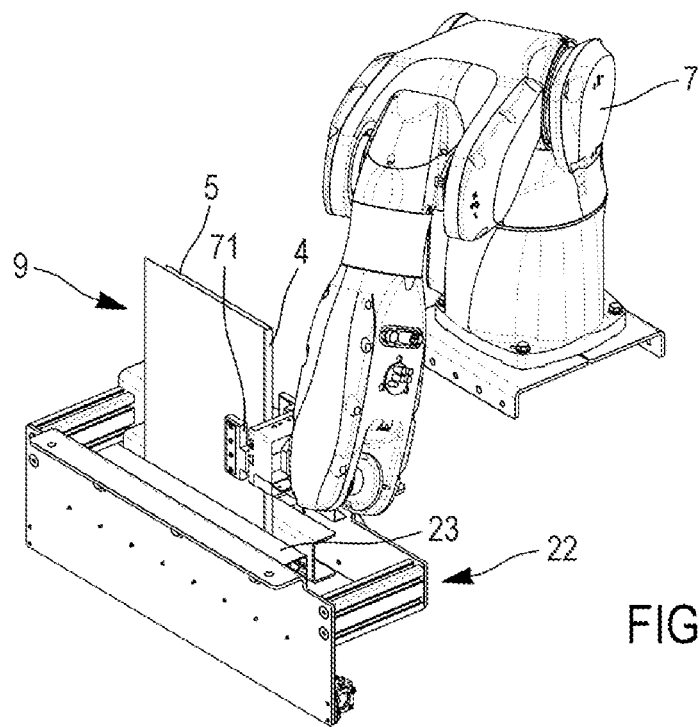
FIG. 17 is a perspective view of the robotic arm of the means 7 and of the notch binding station 22 of the device 1 while the book 9 is inserted in the notch binding station 22 and while the arm of the means 7 changes grip on the book 9.
Figure 18:
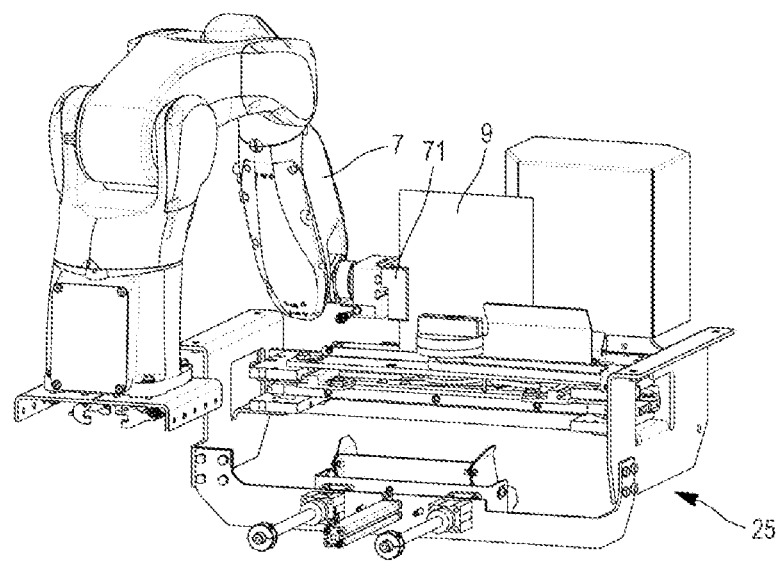
FIG. 18 is a perspective view of the robotic arm of the means 7 and of the trimming station 25 of the device 1 while the book 9 is inserted in the trimming station 25 for a first cutting.
Figure 19:
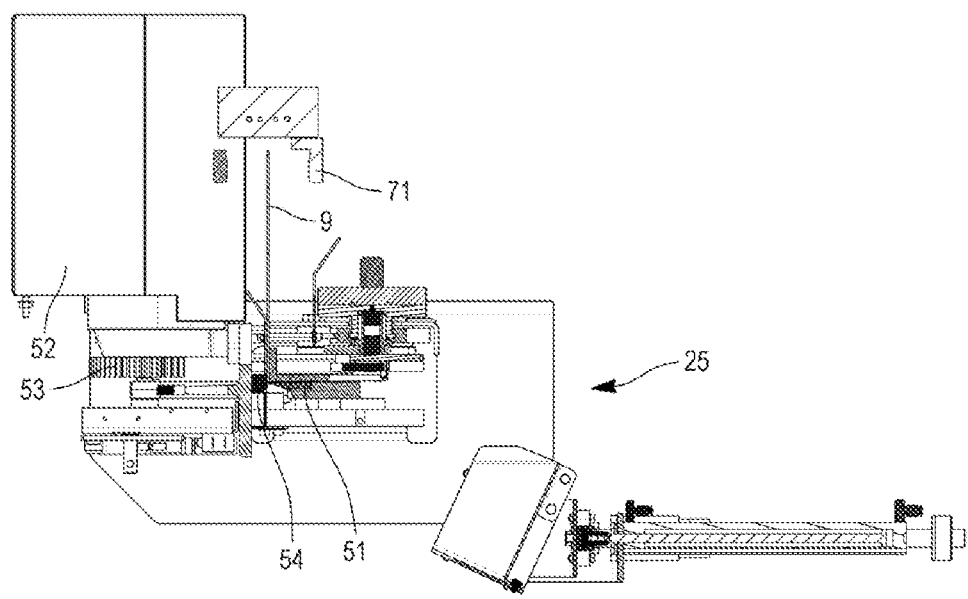
FIG. 19 is a cross-section profile view of the digits 71 of the robotic arm of the means 7 and of the trimming station 25 of the device 1 while the book 9 is inserted in the trimming station 25 for a second cutting.
Figure 20:
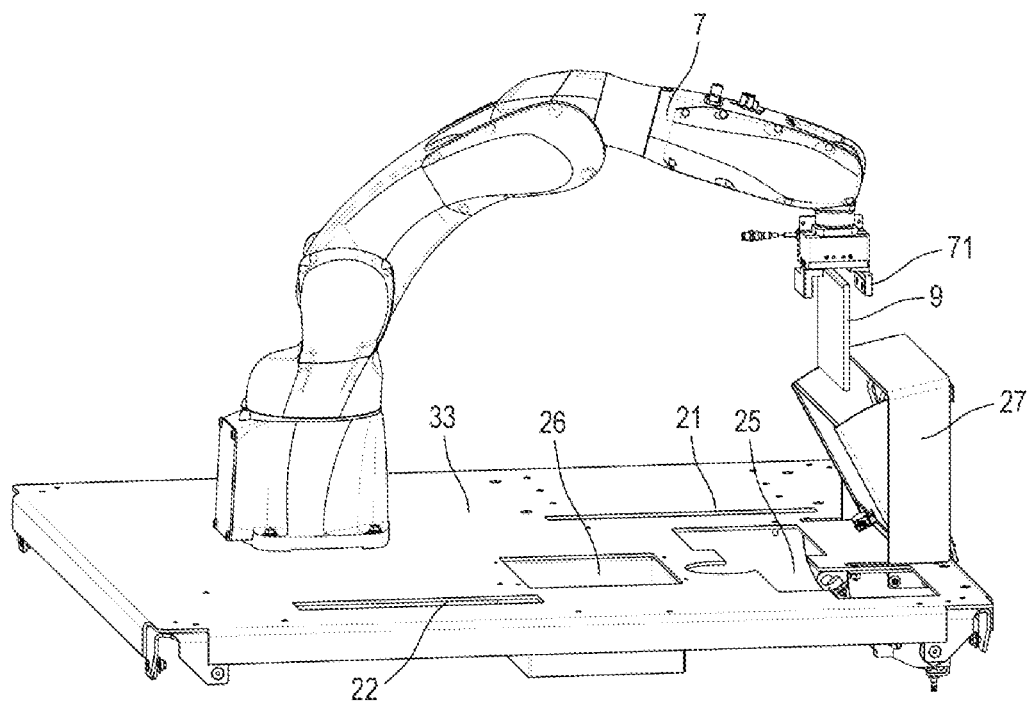
FIG. 20 is a perspective view of the robotic arm of the means 7 and of the output 27 of the device 1 while the book 9 is inserted by the arm of the means 7 in the output 27 (to simplify this FIG. 20, the binding station 6 is not shown therein)

It is noted that the device 1 (more precisely the means 7) has deposited adhesive on the cover 4 so that this deposited adhesive is located between:

- on the one hand, the cover 4 in its deposition position 12 or the cover 4 in its heating position 13 or the adhesive bonding area 8 for the heating position 13 of the cover 4 and,
- on the other hand, the means 10 (more specifically each of the means 201 and 202).

then step 114: the means 7 (more precisely the arm of the means 7) drop the cover 4; then step 115: the means 7 (more precisely the arm of the means 7) grip the book block 5 and transport the book block from the book block printing or receiving station 3; then step 116 (optional, in the case of the book block 5 in the station 3 being in large format for manufacturing a book 9 in a format at least twice as small): the transport means 7 (more precisely the arm of the means 7) transport the book block 5 in an initial format, preferably A4, up to the trimming station 25, then hold the book block 5 in the trimming station 25 for cutting the book block 5 into one part of the book block 5 held in the transport means 7 and another part of the book block 5 cut and directed (by falling) towards the catch tray 26; then step 117 (optional, in the case of the book block 5 in the station 3 being in large format for manufacturing a book 9 in a format at least twice as small): the transport means 7 (more precisely the arm of the means 7) assemble in the catch tray 26 the two parts of the book block 5 so as to form in the transport means 7 a book block 5 having a reduced format, preferably A5, but having an increased thickness in comparison with its initial format; then step 118: as illustrated in FIGS. 9 to 11, the means 7 (more precisely the arm of the means 7) transport the book block up to the notch binding station 22 comprising the book block container 23; this container 23 immobilizes the book block 5 while the means 24 carry out a notch binding of an edge of the book block 5 when it is arranged in the book block container 23 of the notch binding station 22; then step 119: the transport means 7 (more precisely the arm of the means 7) transport the book block 5 from the notch binding station 22 up to the binding station 6, more precisely up to the book block container 20 of the binding station 6; the book block 5 is thus received, in the book block container 20 of the binding station 6, in its receiving position 16 illustrated in FIG. 12; then step 120: the transport means 7 (more precisely the arm of the means 7) drop the book block 5 in the book block container 20 in its receiving position 16; then step 121: the transport means 7 (more precisely the arm of the means 7) grip the cover 4; then step 122: as illustrated in FIG. 13, the transport means 7 (more precisely the arm of the means 7) position the cover 4 in the pre-assembly position 14 in which the adhesive bonding area 8 is not located under the heating means 10; the pre-assembly position 14 is offset with respect to the heating position 13 in the offset direction 17; the cover 4 is located on its support surface or plate in one and the same plane, called adhesive bonding plane 19, for the deposition 12, heating 13 and pre-assembly 14 positions; the adhesive bonding area 8 is located under the book block container 20 of the binding station 6 when the cover 4 is in its pre-assembly position 14; in its receiving position 16 the book block 5 extends perpendicularly or substantially perpendicularly (at more or less 20°) to the cover 4 in its pre-assembly position 14; then step 123: the transport means 7 (more precisely the arm of the means 7) drop the cover 4; then step 124: as illustrated in FIG. 14, the cover 4 is positioned in its assembly position 15 (by pivoting of the surface for supporting the cover 4 in the direction of the container 20); this position 15 is offset with respect to the pre-assembly position 14 at least partly perpendicularly to the offset direction 17 (and to the plane 19) so as to assemble or case-in the cover 4 and the book block 5 by adhesion; in its receiving position 16, the book block 5 extends perpendicularly or substantially perpendicularly (at more or less 20°) to the cover 4 in its assembly position 15; the book block 5 and the cover 4 are then assembled or cased-in, at the binding station 6, by adhesion of the adhesive deposited on the area 8; then step 125: the transport means 7 (more precisely the arm of the means 7) grip the book 9, thus assembled, but touching only the book block 5; then step 126: as illustrated in FIG. 15, the transport means 7 (more precisely the arm of the means 7) remove the book 9 from the binding station 6 perpendicularly or substantially perpendicularly (at more or less 20°) to the offset direction 17 (and parallel or substantially parallel (at more or less 20°) to the adhesive bonding plane 19) and touching only the book block 5; then step 127: the transport means 7 (more precisely the arm of the means 7) transport the assembled book 9 from the binding station 6 and up to the book block container 23 of the notch binding station 22 touching only the book block 5; then step 128: as illustrated in FIG. 16, the transport means 7 (more precisely the arm of the means 7) drop the book 9 in the book block container 23 of the notch binding station 22; then step 129: as illustrated in FIG. 17, the transport means 7 (more precisely the arm of the means 7) change grip by gripping the book 9 by at least a part of the cover 4 adhesively bonded to the book block 5 while the book 9 is still in the book block container 23 of the notch binding station 22; then step 130: the transport means 7 (more precisely the arm of the means 7) transport the book 9 from the notch binding station 22 and up to the trimming station 25; then step 131: as illustrated in FIG. 18, trimming, by means of the trimming station 25, a first side ("foot") of the book 9; then step 132: as illustrated in FIG. 19, trimming, by means of the trimming station 25, a second side ("fore-edge") of the book 9 (the book 9 is pivoted by 90° with respect to FIG. 18), also called "lateral cut"; then step 133: trimming, by means of the trimming station 25, a third side ("head") of the book 9 (the book 9 is pivoted by 180° with respect to FIG. 18); then step 134: as illustrated in FIG. 20, the transport means 7 (more precisely the arm of the means 7) transport the book 9 from the trimming station 25 and up to the output station 27; then step 135: the transport means 7 (more precisely the arm of the means 7) drop the book 9 in the output station 27. A safety means of the device according to the invention unlocks the hatch of the station 27 so that the client opens the hatch safely and can retrieve the book 9 from outside the device.

According to the variants in question of this embodiment of the method according to the invention, each of the steps of the block of steps 100 and 115 to 119 can be implemented before, after, simultaneously or alternately with each of the steps of the block of steps 101 to 114.

With reference to the description of the embodiments of the device and method according to the invention:

at the cover printing or receiving station 2, the cover 4 is typically in SRA3 or SRA4 format according to standard ISO 217 (ICS no. 85.060), at the book block printing or receiving station 3, the book block 5 is typically in A4 or A5 format according to standard ISO 216 (ICS no. 85.080.10).

Typically:

at the station 2, the cover 4 is in the SRA3 format and, at the station 3, the book block 5 is in:

A4 format, without being cut (according to steps 116 and 117), so that the book block 5 retains its A4 format until assembled with the cover 4, or A5 format, without being cut (according to steps 116 and 117), so that the book block 5 retains its A5 format until assembled with the cover 4 (which involves a larger cover surface that is removed during the trimming 130, 131, 132, 133 of the book than in the preceding case), or A4 format, being then cut (according to steps 116 and 117), so that the book block 5 is in A5 format when assembled with the cover 4, or at the station 2, the cover 4 is in the SRA4 format and, at the station 3, the book block 5 is in:

A5 format, without being cut (according to steps 116 and 117), so that the book block 5 retains its A5 format until assembled with the cover 4, or A4 format, being then cut (according to steps 116 and 117), so that the book block 5 is in A5 format when assembled with the cover 4.

Of course, the invention is not limited to the examples that have just been described and various adaptations may be made to these examples without exceeding the scope of the invention.

In variants that can be combined together:

all or some of the steps 100 and 115 to 119 are carried out before step 110, or even before step 101, and/or it is the means 7 which, while gripping the book block 5, measure the thickness of this book block 5 in order to determine the quantity of adhesive to be deposited on the adhesive bonding area 8 of the cover 4; and/or the adhesive may be deposited not by the arm of the means 7 but by another robotic arm or another technical means dedicated to the depositing of adhesive, this other arm or technical means being:

mobile with respect to the casing 30 so as to deposit the adhesive in several locations in the adhesive bonding area 8, or immobile with respect to the casing 30, the cover 4 being moved by the arm of the means 7 so as to deposit the adhesive in several locations in the adhesive bonding area 8.

Of course, the different features, forms, variants and embodiments of the invention can be combined with one another in various combinations, provided that they are not incompatible or mutually exclusive. In particular, all the variants and embodiments described previously can be combined together.

The invention claimed is:

1. A device for manufacturing a book on demand, comprising:

a cover printing or receiving station arranged to respectively print or receive a cover;

a book block printing or receiving station arranged to respectively print or receive a book block;

a binding station arranged to assemble the book block and the cover; and transport means arranged and/or programmed to transport the cover and/or the book block between the different stations;

said device being arranged to deposit adhesive on an adhesive bonding area of the cover inside the binding station before assembly of the cover and the book block by adhesion, forming a book;

the device comprising heating means arranged to heat and/or maintain at a heated temperature adhesive deposited on the adhesive bonding area of the cover before assembly of the cover and the book block by adhesion such that the adhesive is located between the cover and the heating means, the heating means comprising:

means for generating heat;

a mouth arranged to limit an extent of a diffusion of the heat; and a controller arranged and/or programmed to control an opening of the mouth as a function of a quantity and/or a width of adhesive deposited on the adhesive bonding area and/or as a function of a thickness of the book block.

2. The device according to claim 1, characterized in that the transport means are arranged and/or programmed to position the cover in several positions comprising:

a deposition position in which the adhesive bonding area is not located under the heating means and in which the device is arranged to deposit the adhesive on the adhesive bonding area;

a heating position in which the adhesive bonding area is located under the heating means; and a pre-assembly position in which the adhesive bonding area is not located under the heating means, the heating position being offset with respect to the deposition position in an offset direction and the pre-assembly position being offset with respect to the heating position in this offset direction.

3. The device according to claim 2, characterized in that the binding station comprises clamping means arranged to immobilize the cover in the deposition position.

4. The device according to claim 2, characterized in that the cover is located in a same plane called adhesive bonding plane for these deposition, heating and pre-assembly positions.

5. The device according to claim 2, characterized in that the binding station is arranged and/or programmed to position the cover in an assembly position offset with respect to the pre-assembly position at least partly perpendicularly to the offset direction so as to assemble the cover and the book block by adhesion.

6. The device according to claim 2, characterized in that the binding station comprises a book block container arranged to receive the book block in a receiving position, the transport means being arranged and/or programmed so that in the deposition position the adhesive bonding area is not located under the book block container of the binding station and so that in the pre-assembly position the adhesive bonding area is located under the book block container of the binding station.

7. The device according to claim 6, characterized in that in its receiving position the book block extends perpendicularly or substantially perpendicularly to the cover in its pre-assembly position and/or in its assembly position.

8. The device according to claim 2, characterized in that the transport means are arranged and/or programmed to remove the book from the binding station perpendicularly or substantially perpendicularly to the offset direction and touching only the book block.

9. The device according to claim 1, characterized in that it comprises a creasing station arranged to crease the cover along several parallel lines extending over an entire width or length of the cover, the transport means being arranged and/or programmed to insert the cover in the creasing station in a creasing position.

10. The device according to claim 9, characterized in that the deposition position of the cover is offset with respect to the creasing position of the cover at least in the offset direction.

11. The device according to claim 9, characterized in that the creasing position of the cover intersects the deposition position of the cover.

12. The device according to claim 9, characterized in that in its creasing position the cover extends perpendicularly or substantially perpendicularly to the cover in its deposition position.

13. The device according to claim 1, characterized in that the transport means comprise a robotic arm equipped with digits arranged and/or programmed to manipulate the cover and/or the book block.

14. The device according to claim 13, characterized in that the device comprises an adhesive applicator gun, the robotic arm being arranged and/or programmed to grip the adhesive applicator gun to deposit adhesive on the adhesive bonding area of the cover when the cover is placed in the binding station.

15. The device according to claim 13, characterized in that the adhesive applicator gun comprises:
an adhesive reserve comprising a thread of solid adhesive wound in a form of a coil,
means for unwinding the thread from the coil by an end of this thread and for melting this end of the adhesive thread so as to deliver the adhesive in a liquid or paste form.

16. The device according to claim 1, characterized in that it comprises means for measuring or determining a thickness of the book block.

17. The device according to claim 16, characterized in that the device is arranged and/or programmed to determine then deposit a quantity of adhesive on the adhesive bonding area of the cover inside the binding station, this quantity of adhesive being a function of the measured or determined thickness of the book block.

18. The device according to claim 1, characterized in that the cover printing or receiving station and the book block printing or receiving station comprise a printer shared between these two stations.

19. The device according to claim 1, characterized in that it comprises a notch binding station, the transport means being arranged and/or programmed to transport the book block from the book block printing or receiving station and up to the notch binding station and from the notch binding station up to the binding station, the notch binding station comprising a book block container and means for notch binding an edge of the book block when it is arranged in the book block container of the notch binding station.

20. The device according to claim 19, characterized in that the transport means are arranged and/or programmed to:
transport an assembled book from the binding station and up to the book block container of the notch binding station touching only the book block,
then drop the book in the book block container of the notch binding station,
then change grip by gripping the book by at least a part of the cover adhesively bonded to the book block.

21. The device according to claim 19, characterized in that it comprises a trimming station arranged to trim the book.

22. The device according to claim 21, characterized in that the transport means are arranged and/or programmed to transport the book from the notch binding station and up to the trimming station.

23. The device according to claim 21, characterized in that the trimming station is linked to a catch tray, the transport means being arranged and/or programmed to transport the book block in an initial format, up to the trimming station, then hold the book block in the trimming station for cutting into one part of the book block held in the transport means and another part of the book block cut and directed towards the catch tray, then assemble the two parts of the book block so as to form in the transport means a book block having a reduced format, but having an increased thickness in comparison with its initial format.

24. The device according to claim 1, characterized in that it comprises a casing enclosing all of the stations, said casing comprising a lower part that is opaque and an upper part equipped with a transparent window, the lower part and the upper part being separated by a separator plate that is opaque, said device further including that:
a robotic arm is located at least partly in the upper part;
the binding station is located at least partly in the upper part;
a creasing station is located at least partly in the upper part;

a notch binding station is located at least partly in the lower part and is accessible from the upper part through a slot made in the separator plate;

a trimming station is located at least partly in the lower part and is accessible from the upper part through a slot made in the separator plate;

the book block printing or receiving station is located at least partly in the upper part; and the cover printing or receiving station is located at least partly in the upper part.

25. A method for manufacturing a book on demand, comprising:

printing or receiving, respectively at a cover printing or receiving station, a cover;

printing or receiving, respectively at a book block printing or receiving station, a book block;

assembling, at a binding station, the book block and the cover;

transporting, by transport means, the cover and/or the book block between the different stations;

depositing adhesive on an adhesive bonding area of the cover inside the binding station before assembly of the cover and the book block by adhesion, forming a book; and heating or maintaining at a heated temperature, by heating means, the adhesive deposited on the adhesive bonding area of the cover before assembly of the cover and the book block by adhesion such that the deposited adhesive is located between the cover and the heating means, the heating or maintaining at a heated temperature comprising:

generating heat;

limiting an extent of a diffusion of this heat by means of a mouth; and controlling, by means of a controller, an opening of the mouth as a function of a quantity and/or a width of adhesive deposited on the adhesive bonding area and/or as a function of a thickness of the book block.

* * * * *